(12) United States Patent
Raghavan et al.

(10) Patent No.: US 12,395,869 B2
(45) Date of Patent: Aug. 19, 2025

(54) RADIO LINK MONITORING ENHANCEMENTS FOR POWER SAVINGS

(71) Applicant: Apple Inc., Cupertino, CA (US)

(72) Inventors: Manasa Raghavan, Sunnyvale, CA (US); Hua Li, Beijing (CN); Jie Cui, Sunnyvale, CA (US); Hong He, Sunnyvale, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 760 days.

(21) Appl. No.: 17/290,692

(22) PCT Filed: Oct. 30, 2019

(86) PCT No.: PCT/US2019/058758
§ 371 (c)(1),
(2) Date: Apr. 30, 2021

(87) PCT Pub. No.: WO2020/092498
PCT Pub. Date: May 7, 2020

(65) Prior Publication Data
US 2022/0022064 A1 Jan. 20, 2022

Related U.S. Application Data

(60) Provisional application No. 62/755,188, filed on Nov. 2, 2018.

(51) Int. Cl.
*H04W 24/08* (2009.01)
*H04L 5/00* (2006.01)
*H04W 52/02* (2009.01)

(52) U.S. Cl.
CPC ........... *H04W 24/08* (2013.01); *H04L 5/0048* (2013.01); *H04W 52/0216* (2013.01)

(58) Field of Classification Search
CPC .. H04W 24/08; H04W 5/0048; H04W 52/0216
See application file for complete search history.

(56) References Cited

U.S. PATENT DOCUMENTS

| 8,744,518 B2 | 6/2014 | Shi et al. |
| 2012/0108177 A1 | 5/2012 | Miao et al. |

(Continued)

FOREIGN PATENT DOCUMENTS

| CN | 101969361 A | 2/2011 |
| CN | 104488205 A | 4/2015 |

(Continued)

OTHER PUBLICATIONS

3GPP TS 38.133 V15.3.0 (Sep. 2018); 3rd Generation Partnership Project; Technical Specification Group Radio Access Network; NR ; Requirements for support of radio resource management (Release 15) (Year: 2018).*

(Continued)

*Primary Examiner* — Joseph A Bednash
(74) *Attorney, Agent, or Firm* — Thorpe North & Western, LLP.

(57) ABSTRACT

Systems, apparatuses, methods, and computer-readable media are provided for radio link monitoring (RLM) evaluation period and layer 1 (L1) indication interval enhancements. A user equipment (UE) uses a scaling factor to scale the RLM evaluation period and/or the L1 indication interval. Different scaling factors may be used for different scenarios, conditions, or criteria. The same or different scaling factors may be used for the RLM evaluation period and the L1 indication interval. The scaling factor or a scaling factor index may be signaled to the UE by higher layer signaling. Other embodiments may be described and/or claimed.

17 Claims, 6 Drawing Sheets

(56) References Cited

U.S. PATENT DOCUMENTS

| | | | |
|---|---|---|---|
| 2012/0281563 | A1 | 11/2012 | Comsa et al. |
| 2013/0188623 | A1 | 7/2013 | Chen et al. |
| 2013/0303153 | A1 | 11/2013 | Bontu et al. |
| 2016/0192269 | A1 | 6/2016 | Kim et al. |
| 2016/0242231 | A1 | 8/2016 | Vajapeyam et al. |
| 2020/0112893 | A1 | 4/2020 | Li et al. |

FOREIGN PATENT DOCUMENTS

| | | | | |
|---|---|---|---|---|
| EP | 2665207 | A1 | 11/2013 | |
| JP | 2013542684 | A | 11/2013 | |
| JP | 2015-521396 | A | 7/2015 | |
| JP | 2018-523426 | A | 8/2018 | |
| KR | 20110034902 | A | 4/2011 | |
| WO | 2018156696 | A1 | 8/2018 | |
| WO | WO-2019159096 | A1 * | 8/2019 | ......... H04L 41/0813 |

OTHER PUBLICATIONS

International Search Report and Written Opinion of the International Searching Authority directed to related International Patent Application No. PCT/US2019/058758, mailed Feb. 18, 2020; 11 pages.
3GPP TS 38.133 v15.3.0, '3GPP; TSG RAN; NR; Requirements for support of radio resource management (Release 15)', Oct. 3, 2018.
NIT Docomo, Inc., 'Discussion on requirements of Radio Link Monitoring', R4-1804613, 3GPP TSG RAN WG4 Meeting #86bis, Melbourne, Australia, Apr. 6, 2018.
NIT Docomo, Inc., 'Requirements for beam failure detection based on SSB and CSI-RS', R4-1806392, 3GPP TSG RAN WG4 Meeting #87, Busan, Korea, May 14, 2018.
Intel Corporation, 'Discussion about indication interval for NR RLM', R4-1808721, 3GPP TSG-RAN WG4 Meeting #AH07, Montreal, Canada, Jun. 25, 2018.
Huawei et al., 'Discussion on scope of CSI-RS RRM requirement', R4-1802665, 3GPP TSG-RAN WG4 Meeting #86, Athens, Greece, Feb. 19, 2018.
3GPP TS 23.501 V15.3.0, 3rd Generation Partnership Project; Technical Specification Group Services and System Aspects; System Architecture for the 5G System; Stage 2 (Release 15), Sep. 2018; 226 pages.
3GPP TS 36.214 V15.3.0, 3rd Generation Partnership Project; Technical Specification Group Radio Access Network; Evolved Universal Terrestrial Radio Access (E-UTRA); Physical layer; Measurements (Release 15), Sep. 2018; 25 pages.
3GPP TS 38.113 V15.3.0, 3rd Generation Partnership Project; Technical Specification Group Radio Access Network; NR, Base Station (BS) ElectroMagnetic Compatibility (EMC) (Release 15), Sep. 2018; 31 pages.
3GPP TS 38.133 V15.3.0, 3rd Generation Partnership Project; Technical Specification Group Radio Access Network; NR; Requirements for support of radio resource management (Release 15), Sep. 2018; 136 pages.
3GPP TS 38.211 V15.3.0, 3rd Generation Partnership Project; Technical Specification Group Radio Access Network; NR; Physical channels and modulation (Release 15), Sep. 2018; 96 pages.
3GPP TS 38.212 V15.3.0, 3rd Generation Partnership Project; Technical Specification Group Radio Access Network; NR; Multiplexing and channel coding (Release 15), Sep. 2018, 99 pages.
3GPP TS 38.213 V15.3.0, 3rd Generation Partnership Project; Technical Specification Group Radio Access Network; NR; Physical layer procedures for control (Release 15), Sep. 2018, 101 pages.
3GPP TS 38.214 V15.3.0, 3rd Generation Partnership Project; Technical Specification Group Radio Access Network; NR; Physical layer procedures for data (Release 15), Sep. 2018, 96 pages.
3GPP TS 38.215 V15.3.0,3rd Generation Partnership Project; Technical Specification Group Radio Access Network; NR; Physical layer measurements (Release 15), Sep. 2018, 15 pages.
3GPP TS 38.304 V15.0.0, 3rd Generation Partnership Project; Technical Specification Group Radio Access Network; NR; User Equipment (UE) procedures in Idle mode and RRC Inactive state (Release 15), Jun. 2018, 25 pages.
3GPP TS 38.321 V15.3.0, 3rd Generation Partnership Project; Technical Specification Group Radio Access Network; NR; Medium Access Control (MAC) protocol specification (Release 15), Sep. 2018, 76 pages.
3GPP TS 38.331 V15.3.0, 3rd Generation Partnership Project; Technical Specification Group Radio Access Network; NR; Radio Resource Control (RRC) protocol specification (Release 15), Sep. 2018, 445 pages.
MediaTek Inc., "Discussion on Gap Sharing," 3GPP TSG-RAN WG4 AH1801 Meeting, San Diego, CA, USA, Jan. 21-26, 2017, R4-1800111; 13 pages.
Nokia, Nokia Shanghai Bell, "CR for remaining open issues in SSB RLM," 3GPP TSG-RAN WG4#87, Busan, Korea (Republic of), May 21-25, 2018, R4-1807985; 6 pages.
Huawei, "Discussion on open issues for RLM and BFD requirements," 3GPP TSG-RAN WG4 Meeting #88, R4-1810688, Aug. 20, 2018; pp. 1-3.

* cited by examiner

RADIO LINK MONITORING ENHANCEMENTS FOR POWER SAVINGS

RELATED APPLICATIONS

The present application is a National Stage entry from PCT/US2019/058758 filed on Oct. 30, 2019, entitled "Radio Link Monitoring Enhancements for Power Savings," which claims priority to U.S. Provisional App. No. 62/755,188 filed Nov. 2, 2018, both of which are incorporated herein by reference in their entireties.

FIELD

Various embodiments of the present application generally relate to the field of wireless communications, and in particular, to enhancements to Radio Link Monitoring.

BACKGROUND

The next generation wireless communication systems, referred to as Fifth Generation (5G) or new radio (NR) systems, includes Radio Link Monitoring functions where a user equipment monitors downlink radio link quality for the purpose of indicating out-of-sync and in-sync statuses to higher layers. The reported out-of-sync and in-sync statuses are used for detecting radio link failures.

DETAILED DESCRIPTION

Embodiments discussed herein provide enhancements the Radio Link Monitoring (RLM) evaluation period and layer 1 (L1) indication interval to save or conserve user equipment power. In various embodiments, a user equipment (UE) uses the scaling factor to scale the RLM evaluation period and/or the L1 indication interval. Different scaling factors may be used for different scenarios, for example, based on UE mobility or UE coverage, radio conditions, and/or the like. The same or different scaling factors may be used for the RLM evaluation period and the L1 indication interval. The scaling factor or a scaling factor index may be signaled to the UE by higher layer signaling. The scaling factor index is an index that the UE may use to find or otherwise determine the numeric value of the scaling factor. Other embodiments may be described and/or claimed.

Figure 1:
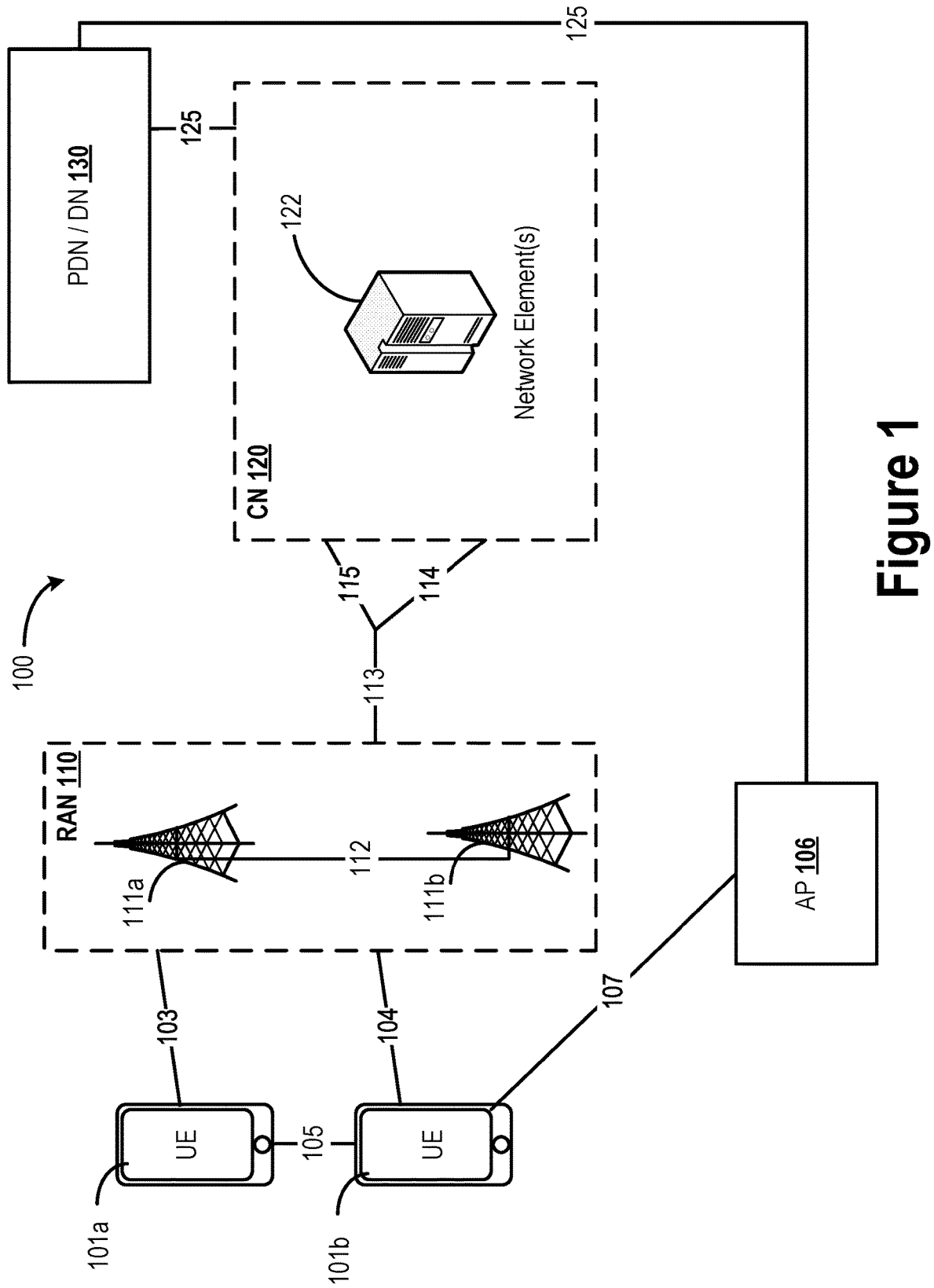
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the Fifth Generation (5G) or New Radio (NR) system standards or Long Term Evolution (LTE) system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., Wireless Metropolitan Area Network (WMAN), Worldwide Interoperability for Microwave Access (WiMAX), etc.), or the like.

As shown by FIG. 1, the system 100 includes user equipment (UE) 101a and UE 101b (collectively referred to as "UEs 101" or "UE 101"). A UE 101 is any device with radio communication capabilities, such as a wireless communications interface, and describes a remote user of network resources in a communications network. In this example, UEs 101 are illustrated as smartphones, but may also comprise any mobile or non-mobile computing device, such as consumer tablet computers, wearable devices, desktop computers, laptop computers, in-vehicle infotainment (IVI) devices, head-up display (HUD) devices, Internet of Things (IoT) devices, embedded systems or microcontrollers, networked or "smart" appliances, and/or the like. The UEs 101 include various hardware elements such as baseband circuitry, memory circuitry, radiofrequency (RF) circuitry, and interface circuitry (e.g., input/output (I/O) interfaces), some or all of which may be coupled with one another via a suitable interconnect (IX) technology. The RF circuitry includes various hardware elements (e.g., switches, filters, amplifiers, digital signal processors (DSPs), etc.) configured to enable communication with wireless networks using modulated electromagnetic radiation through a non-solid medium. The electronic elements may be arranged as receive signal path (or receiving (Rx) RF chain) to down-convert received RF signals and provide baseband signals to the baseband circuitry, and arranged as a transmit signal path to up-convert baseband signals provided by the baseband circuitry and provide RF output signals to an antenna array via a front-end module for transmission. The baseband circuitry and RF circuitry allow the UEs 101 to connect or communicatively couple with a Radio Access Network (RAN) 110. In various embodiments, the UEs 101 may have multiple panels or multiple antenna arrays, and are configured to receive multiple independently scheduled data streams from different TRPs 111 in a multiple-DCI based multi-TRP/panel transmission. These aspects are discussed in more detail infra.

The UE 101b is shown to be configured to access an access point (AP) 106 via connection 107. The connection 107 can comprise a local wireless area network (WLAN) connection consistent with any IEEE 802.11 protocol, wherein the AP 106 may be a WiFi® router, gateway appliance, or the like. In this example, the AP 106 is shown to be connected to the Internet without connecting to the core network of the wireless system (described in further detail below). In various embodiments, the UE 101b, RAN 110, and AP 106 may be configured to utilize LTE-WLAN aggregation (LWA) operation and/or LTE/WLAN Radio Level Integration with IPsec Tunnel (LWIP) operation.

The RAN 110 is a set of RAN nodes 111 that implement a Radio Access Technology (RAT); the term "RAT" as used herein refers to a type of technology used for radio access such as NR, E-UTRA, WiFi/WLAN, and/or the like. The set of RAN nodes 111 in the RAN 110 are connected to one another via interface 112 and connected to the CN 120 through interface 113. In embodiments, the RAN 110 may be a Universal Terrestrial Radio Access Network (UTRAN) or Groupe Special Mobile (GSM)/Enhanced Datarates for GSM (EDGE) RAN (GERAN) when system 100 is an UTRAN or GERAN system, an Evolved UTRAN (E-UTRAN) when system 100 is an LTE or 4G system, or a next generation (NG) RAN or a 5G RAN when system 100 is an NR/5G system. The UEs 101 utilize connections (or channels) 103 and 104, respectively, each of which comprises a physical communications interface or layer. The term "channel" or "link" as used herein refers to any transmission medium, either tangible or intangible, which is used to communicate data or a data stream. Additionally, the term "link" as used herein refers to a connection between two devices through a RAT for the purpose of transmitting and receiving information. In FIG. 1, the connections 103 and 104 are illustrated as an air interface to enable communicative coupling, and can be consistent with cellular communications protocols, such as GSM, Code-Division Multiple Access (CDMA), Push-to-Talk (PTT) and/or PPT over cellular (POC), UMTS, LTE, 5G/NR, and/or the like. The UEs 101 may also directly exchange data via a Proximity Services (ProSe) or sidelink (SL) interface 105 comprising one or more physical and/or logical SL channels.

The RAN 110 includes one or more RAN nodes 111a and 111b (collectively referred to as "RAN nodes 111" or "RAN node 111") that enable the connections 103 and 104. The RAN nodes 111 are infrastructure equipment that provide the radio baseband functions for data and/or voice connectivity between a network (e.g., core network (CN) 120) and one or more users (e.g., UEs 101). The RAN nodes 111 can be referred to as NodeBs 111 in UMTS systems, evolved NodeBs (eNBs) 111 in LTE systems, next generation NodeBs (gNBs) 111 or next generation eNBs (ng-eNBs) in 5G/NR systems, Road Side Units (RSUs) for vehicle-to-everything (V2X) implementations, and so forth. In some embodiments, each RAN node 111 may be a Transmission/Reception Point (TRP). In other embodiments, each RAN node 111 may have multiple antenna elements, where each antenna element may be an individual TRP.

The RAN nodes 111 can comprise ground stations (e.g., terrestrial access points) or satellite stations providing coverage within a geographic area (e.g., a cell). The RAN nodes 111 may be implemented as one or more dedicated physical devices such as a macrocell base stations, and/or a low power base stations for providing femtocells, picocells, or other like cells having smaller coverage areas, smaller user capacity, or higher bandwidth compared to macrocells. Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, UL and DL dynamic radio resource management and data packet scheduling, and mobility management.

In some embodiments, all or parts of the RAN nodes 111 may be implemented as one or more software entities running on server computers as part of a virtual network (e.g., a cloud RAN (CRAN), virtual baseband unit pool (vBBUP), or the like). In these embodiments, the RAN nodes 111 may implement a RAN function split where different protocol entities are operated by different elements. The term "element" as used herein refers to a unit that is indivisible at a given level of abstraction and has a clearly defined boundary. One or more RAN nodes 111 may represent individual distributed units (DUs) that are connected to centralized unit (CU) via respective F1 interfaces (not shown by FIG. 1). In these implementations, the gNB-DUs may include one or more remote radio heads or RFEMs, and the gNB-CU may be operated by a server that is located in the RAN 110 (not shown) or by a server pool in a similar manner as a CRAN/vBBUP.

The RAN nodes 111 may be configured to communicate with one another via interface 112. The interface 112 may include a user plane interface for carrying user plane data between the RAN nodes 111, and a control plane interface for carrying control signaling between the RAN nodes 111. The interface 112 may be an X2 interface 112 when the system 100 is an LTE system, and the interface 112 may be an Xn interface 112 when the system 100 is a 5G/NR system. In some embodiments, interface 112 may be a wireless backhaul connection.

In embodiments, the UEs 101 can be configured to communicate using Orthogonal Frequency Division Multiplexing (OFDM) communication signals with each other or with any of the RAN nodes 111 over a multicarrier communication channel in accordance with various communication techniques, such as, but not limited to, an OFDMA communication technique (e.g., for DL communications) or a Single Carrier Frequency Division Multiple Access (SC-FDMA) communication technique (e.g., for UL and ProSe/SL communications), although the scope of the embodiments is not limited in this respect. The OFDM signals can comprise a plurality of orthogonal subcarriers.

DL and UL transmissions may be organized into frames with 10 ms durations, where each frame includes ten 1 ms subframes, and each subframe includes an integer number of slots. Time-frequency radio resource grids may be used to indicate physical resources in the DL or UL in corresponding slots. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. There is one resource grid for a given antenna port p, subcarrier spacing (SCS) configuration μ, and transmission direction (DL or UL). The frequency location of a subcarrier refers to the center frequency of that subcarrier. Each element in the resource grid for antenna port p and SCS configuration μ is called a resource element (RE) and is uniquely identified by $(k, l)_{p,\mu}$ where k is the index in the frequency domain (e.g., k is a subcarrier index relative to a reference or reference point) and l refers to the symbol position in the time domain relative to some reference point (e.g., l is an OFDM symbol index relative to a reference or reference point). RE $(k, l)_{p,\mu}$ corresponds to a physical resource and the complex value $a_{k,l}^{(p,\mu)}$. In other words, $a_{k,l}^{(p,\mu)}$ is the value of RE (k, l) for antenna port p and SCS configuration pt. An antenna port is defined such that the channel over which a symbol on the antenna port is conveyed can be inferred from the channel over which another symbol on the same antenna port is conveyed. Two antenna ports are said to be quasi co-located (QCLed) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A collection of REs make up a resource block (RB), which is usually defined as $N_{sc}^{RB}=12$ consecutive subcarriers in the frequency domain. Physical RBs (PRBs) blocks for subcarrier configuration μ are defined within a bandwidth part (BWP) and numbered from 0 to $N_{BWP,i}^{size,\mu}-1$ where i is the number of the BWP. Virtual RBs (VRBs) are defined within a BWP and numbered from 0 to $N_{BWP,i}^{size}-1$ where i is the number of the BWP.

A BWP is a subset of contiguous common RBs for a given numerology $\mu_i$ in BWP i on a given carrier. The UE 101 can be configured with up to four BWPs in the DL with a single DL BWP being active at a given time. The UE 101 is not expected to receive PDSCH, PDCCH, or CSI-RS (except for RRM) outside an active BWP. The UE 101 can be configured with up to four BWPs in the UL with a single UL BWP being active at a given time. The UE 101 does not transmit PUSCH or PUCCH outside an active BWP. For an active cell, the UE 101 does not transmit SRS outside an active BWP.

Common RBs are numbered from 0 and upwards in the frequency domain for SCS configuration pt. The center of subcarrier 0 of common RB 0 for SCS configuration μ coincides with 'point A'. The relation between the common RB number $n_{CRB}^{\mu}$ in the frequency domain and resource elements (k, l) for SCS configuration μ is given by $$n_{CRB}^{\mu} = \left\lfloor \frac{k}{N_{SC}^{RB}} \right\rfloor,$$

where k is defined relative to point A such that k=0 corresponds to the subcarrier centered around point A.

Point A serves as a common reference point for RB grids and is obtained from the parameters offsetToPointA PCell DL and absoluteFrequencyPointA for all other cases. The parameter offsetToPointA represents the frequency offset between point A and the lowest subcarrier of the lowest RB, which has the SCS provided by the higher-layer parameter subCarrierSpacingCommon and overlaps with the SS/PBCH block used by the UE 101 for initial cell selection, expressed in units of RBs assuming 15 kHz SCS for FR1 and 60 kHz SCS for FR2. The parameter absoluteFrequencyPointA for all other cases where absoluteFrequencyPointA represents the frequency-location of point A expressed as in Absolute Radio-Frequency Channel Number (ARFCN).

There are several different physical channels and physical signals that are conveyed using RBs, PRBs, and/or individual REs. A physical channel corresponds to a set of REs carrying information originating from higher layers. Physical channels include physical UL channels (e.g., physical UL shared channel (PUSCH), physical UL control channel (PUCCH), physical random access channel (PRACH), etc.) and physical DL channels (e.g., physical DL shared channel (PDSCH), physical DL control channel (PDCCH), physical broadcast channel (PBCH), etc.). A physical signal is used by the physical layer (PHY) but does not carry information originating from higher layers. Physical signals include physical UL signals (e.g., Demodulation Reference Signal (DMRS or DM-RS), Phase-Tracking Reference Signal (PTRS), Sounding Reference Signal (SRS), etc.) and physical DL signals (e.g., DMRS, PTRS, Channel State Information Reference Signal (CSI-RS), Primary Synchronization Signal (PSS), Secondary Synchronization Signal (SSS), etc.).

The PDSCH carries user data and higher-layer signaling to the UEs 101, and the PDCCH carries DL resource assignment information for receiving the PDSCH. Each UE 101 monitors a set of PDCCH candidates on one or more activated serving cells as configured by higher layer signaling for control information (e.g., Downlink Control Information (DCI)), where monitoring implies attempting to decode a set of PDCCH candidates according one or more monitored DCI formats (e.g., DCI formats 0 through 6-2 as discussed in section 5.3.3 of 3GPP TS 38.212 v15.3.0 (2018-09) (hereinafter "TS 38.212 v15.3.0"), DCI formats 0_0 through 2_3 as discussed in section 7.3 of TS 38.212 v15.3.0, or the like). The DCI includes, inter alia, DL assignments and/or UL scheduling grants including, for example, modulation and coding format, resource allocation, and HARQ information, among other information/commands. Each UE 101 monitors (or attempts to decode) respective sets of PDCCH candidates in one or more configured monitoring occasions according to UE or cell-specific search spaces (for LTE/4G), or monitors (or attempts to decode) respective sets of PDCCH candidates in one or more configured monitoring occasions in one or more configured Control Resource Sets (CORESETs) according to corresponding search space configurations (for NR/5G). A CORESET includes a set of PRBs with a time duration of 1 to 3 OFDM symbols. The REGs and CCEs are defined within a CORESET with each CCE including a set of REGs. Interleaved and non-interleaved CCE-to-REG mapping are supported in a CORESET. Each REG carrying PDCCH carries its own DMRS.

PDSCH transmissions are scheduled by DCI format 1_0 and DCI format 1_1. DCI format 1_0 is used for the scheduling of PDSCH in one DL cell and DCI format 1_1 is used for the scheduling of PDSCH in one cell. DCI format 1_0 includes, inter alia, a frequency domain resource assignment, a time domain resource assignment, and other fields/elements as discussed in TS 38.212 v15.3.0. DCI format 1_1 includes, inter alia, a bandwidth part indicator, a frequency domain resource assignment, a time domain resource assignment, antenna port(s) where the number of CDM groups without data of values 1, 2, and 3 refers to CDM groups {0}, {0,1}, and {0,1,2} respectively and the antenna ports $\{p_0, \ldots, p_{\nu-1}\}$ are determined according to the ordering of DMRS port(s) given by Tables 7.3.1.2.2-1/2/3/4 of TS 38.212 v15.3.0, and other fields/elements as discussed in TS 38.212 v15.3.0.

The radio interface 103, 104 between the UEs 101 and the RAN 110 is governed by the Radio Resource Control (RRC) protocol. RRC provides functions including, inter alia, RRC connection control, measurement configuration and reporting, among others. RRC connection control includes, inter alia, paging procedures, radio configuration control, and RRC connection establishment, modification, suspension, resumption, and release. During RRC connection establishment, the network (NW) may configure the UE 101 to perform measurement reporting or other like functions. RRC includes various UE 101 operating states including RRC_CONNECTED, RRC_INACTIVE, and RRC_IDLE. The UE 101 is in RRC_IDLE when no RRC connection is established, and the UE 101 is in RRC_CONNECTED and RRC_INACTIVE when a connection is established. The UE 101 in RRC_CONNECTED transfers unicast data; monitors control channels associated with the shared data channel to determine if data is scheduled for the UE 101; provides channel quality and feedback information; performs neighbor cell measurements and measurement reporting; and acquires system information (SI).

The RRC connection control functions include, inter alia, radio link failure (RLF) functions, link recovery functions, beam failure detection (BFD) functions, and beam failure recovery (BFR) functions. In RRC_CONNECTED, the UE 101 performs RLM in the active BWP based on reference signals (e.g., SSB, CSI-RS, etc.) and signal quality thresholds configured by the NW. SSB-based RLM is based on the SSB associated to the initial DL BWP and can only be configured for the initial DL BWP and for DL BWPs containing the SSB associated to the initial DL BWP. For other DL BWPs, RLM is performed based on CSI-RS. The UE 101 declares an RLF when one of the following criteria are met: expiration of a timer started after indication of radio problems from the physical layer (if radio problems are recovered before the timer is expired, the UE stops the timer); a random access (RA) procedure failure is detected; and/or upon detection of a Radio Link Control (RLC) failure. After an RLF is declared, the UE 101 stays in RRC_CONNECTED; selects a suitable cell and initiates the RRC connection re-establishment procedure; and/or enters RRC_IDLE if a suitable cell was not found within a certain time after RLF was declared.

For detection of physical layer problems in RRC_CONNECTED, the UE 101 starts the timer T310 for a corresponding special cell (SpCell) upon receiving N310 consecutive "out-of-sync" indications for the SpCell from lower layers while neither timers T300, T301, T304, T311 nor T319 are running. Here, "N310" is a maximum number of consecutive "out-of-sync" indications for the SpCell received from lower layers, and may also refer to the value of a counter N310. For recovery of physical layer problems, upon receiving N311 consecutive "in-sync" indications for the SpCell from lower layers while timer T310 is running, the UE 101 stops the timer T310 for the corresponding SpCell. Here, "N311" is a maximum number of consecutive "in-of-sync" indications for the SpCell received from lower layers, and may also refer to the value of a counter N311. In this case, the UE 101 maintains the RRC connection without explicit signalling, and the UE 101 maintains the entire radio resource configuration. Periods in time where neither "in-sync" nor "out-of-sync" is reported by L1 do not affect the evaluation of the number of consecutive "in-sync" or "out-of-sync" indications.

For detection of RLFs, upon timer T310 expiry in a PCell; upon receipt of a random access problem indication from an MCG MAC layer instance while neither timers T300, T301, T304, T311 nor T319 are running; or upon receipt of an indication from an MCG RLC layer instance that the maximum number of retransmissions has been reached, and for the corresponding logical channel allowedServingCells only includes SCell(s), the UE 101 initiates the failure information procedure as specified in section 5.7.5 of 3GPP TS 38.331 v15.3.0 (2018 September) (hereinafter "TS 38.331") to report an RLC failure if the indication is from the MCG RLC layer instance and CA duplication is configured and activated. Otherwise, the UE 101 considers an RLF to be detected for the MCG; performs the actions upon going to RRC_IDLE as specified in section 5.3.11 of TS 38.331 with release cause 'other' if access stratum (AS) security has not been activated; performs the actions upon going to RRC_IDLE as specified in section 5.3.11 of TS 38.331 with release cause 'RRC connection failure' if AS security has been activated but SRB2 and at least one DRB have not been setup; or initiates the connection re-establishment procedure as specified in section 5.3.7 of TS 38.331.

Upon timer T310 expiration in a PSCell; upon receipt of a random access problem indication from an SCG MAC layer instance; or upon receipt of an indication from an SCG RLC layer instance that the maximum number of retransmissions has been reached, and for the corresponding logical channel allowedServingCells only includes SCell(s), the UE 101 initiates the failure information procedure as specified in section 5.7.5 of 38.331 to report an RLC failure if the indication is from the SCG RLC layer instance and CA duplication is configured and activated; considers an RLF to be detected for the SCG; and initiates the SCG failure information procedure as specified in section 5.7.3 of 38.331 to report SCG RLF.

For BFD, the RAN node 111 (e.g., a gNB) configures the UE 101 with BFD reference signals (e.g., SSB, CSI-RS, etc.) and the UE 101 declares a beam failure when a number of beam failure instance indications from the physical layer (PHY) reaches a configured threshold before a configured timer expires. SSB-based BFD is based on the SSB associated to the initial DL BWP and can only be configured for the initial DL BWPs and for DL BWPs containing the SSB associated to the initial DL BWP. For other DL BWPs, BFD is performed based on CSI-RS. After beam failure is detected, the UE 101 triggers a BFR procedure by initiating an RA procedure on the PCell; and selects a suitable beam to perform BFR (e.g., if the gNB 111 has provided dedicated RA resources for certain beams, those will be prioritized by the UE 101). Upon completion of the RA procedure, BFR is considered complete.

UEs 101 in RRC_INACTIVE and RRC_IDLE also perform neighbor cell measurements and cell (re-)selection, among other functions. Cell selection involves "camping on a cell" wherein the UE 101 searches for a suitable cell, selects the suitable cell to provide available services, and monitors for the control channel of the suitable cell. The cell selection process takes place as described in 3GPP TS 38.304 v15.0.0 (2018-06) (hereinafter "TS 38.304"). Cell reselection involves the UE 101 finding a more suitable cell according to cell reselection criteria, and reselecting and camping on the more suitable cell. When the UE 101 is in either Camped Normally state or Camped on Any Cell state on a cell, the UE 101 attempts to detect, synchronize, and monitor intra-frequency, inter-frequency, and inter-RAT cells indicated by the serving cell. UE 101 measurement activity is also controlled by measurement rules defined in TS 38.304, allowing the UE 101 to limit its measurement activity.

The cell (re-)selection process may be speed-dependent, where the UEs 101 may be restricted to the number of reselections they may perform based on a speed or velocity at which the UEs 101 are traveling. In these embodiments, the UEs 101 may be capable of estimating their respective mobility states. A UE's mobility state may be used to avoid frequent cell (re)selections and handovers (HOs), and may be used to enhance other features. The UEs 101 may estimate their respective mobility states by counting the number of handovers and/or cell (re)selections within a selected period of time or a time window. In this regard, the UEs 101 may receive an indication or configuration from the NW of the time window and count thresholds used to determine the respective mobility states. In some embodiments, mobility state estimation may be implemented by the NW by tracking the prior history of handovers or (re) selections for the UEs 101. The process or procedures used by the UEs 101 (or the NW) to estimate or determine their respective mobility states may be referred to as Mobility State Estimation (MSE).

The mobility states may include a normal mobility state, a medium mobility state, and a high mobility state. The classification of a UE's mobility state into one of the aforementioned categories may be based on mobility state parameters including $T_{CRmax}$, $N_{CR\_H}$, $N_{CR\_M}$, and $T_{CRmaxHyst}$ that are sent in the system information broadcast of a serving cell. $T_{CRmax}$ is the duration for evaluating criteria to enter mobility states (e.g., the time period or time window discussed previously); $N_{CR\_H}$ is the threshold number of cell (re)selections to enter the high mobility state; $N_{CR\_M}$ is the number of cell (re)selections to enter the medium mobility state; and $T_{CRmaxHyst}$ is an additional duration (time period, time window, etc.) for evaluating criteria to enter the normal mobility state. For example, a UE 101 may estimate its mobility state to be the medium mobility when the number of cell reselections during time period $T_{CRmax}$ exceeds $N_{CR\_M}$, but does not exceed $N_{CR\_H}$. In another example, a UE 101 may estimate its mobility state to be the high mobility state when the number of cell reselections during time period $T_{CRmax}$ exceeds $N_{CR\_H}$. The UE 101 may estimate its mobility state to be the normal mobility state when the UE's mobility state is neither one of the medium or high mobility states. Additionally, the UEs 101 may not count consecutive reselections between the same two cells into mobility state detection criteria if the same cell is reselected just after one other reselection. If the UE 101 detects the criteria for the high mobility state, then the UE 101 enters or transitions to the high mobility state. If the UE 101 detects the criteria for the medium mobility state, then the UE 101 enters or transitions to the medium mobility state. Otherwise, if criteria for either the medium or the high mobility state are not detected during time period $T_{CRmaxHyst}$, then the UE 101 enters or transitions to the normal mobility state.

The RAN 110 is shown to be communicatively coupled to a core network (CN) 120 comprising one or more network elements 122, which are configured to offer various data and telecommunications services to customers/subscribers (e.g., users of UEs 101) who are connected to the CN 120 via the RAN 110. The term "network element" as used herein refers to physical or virtualized equipment and/or infrastructure used to provide wired or wireless communication network services, and may be considered synonymous with, and/or referred to as, a networked computer, networking hardware, network equipment, network node, router, switch, hub, bridge, radio network controller (RNC), RAN device, RAN node, gateway, server, cloud node, Virtualized Network Function (VNF), NFV Infrastructure (NFVI), and/or the like. The network elements 122 may be one or more server computer systems, which may implement various CN elements (e.g., network functions (NFs) and/or application functions (AFs)) such as those discussed herein. The components of the CN 120 may be implemented in one physical node or separate physical nodes including components to read and execute instructions from a machine-readable or computer-readable medium (e.g., anon-transitory machine-readable storage medium). In some embodiments, Network Function Virtualization (NFV) may be utilized to virtualize any or all network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. As used herein, the terms "instantiate," "instantiation," and the like refers to the creation of an instance, and an "instance" refers to a concrete occurrence of an object, which may occur, for example, during execution of program code. NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more NFs/AFs.

In embodiments where the CN 120 is an Evolved Packet Core (EPC) in LTE systems, the one or more network elements 122 may include or operate one or more Mobility Management Entities (MMEs), Serving Gateways (S-GWs), PDN Gateways (P-GWs), Home Subscriber Servers (HSSs), Policy Control and Charging Rules Functions (PCRFs), and/or other like LTE CN elements. In these embodiments, the E-UTRAN 110 may be connected with the EPC 120 via an S1 interface 113. In these embodiments, the S1 interface 113 is split into two parts: an S1-U interface 114 to carry traffic data between the RAN nodes 111 and the S-GW, and the S1-MME interface 115, which is a signaling interface between the RAN nodes 111 and MMEs. Additionally, the P-GW within the EPC 120 may route data packets between the EPC 120 and external networks such as a network including a Packet Data Network (PDN) 130 via an Internet Protocol (IP) interface 125. The PDN 130 may be an operator external public, a private PDN (e.g., enterprise network, cloud computing service, etc.), or an intra-operator PDN (e.g., for provision of IMS and/or IP-CAN services).

In embodiments where the CN 120 is a 5GC 120, the network elements 122 may implement one or more instances of an Authentication Server Function (AUSF), Access and Mobility Management Function (AMF), Session Management Function (SMF), Network Exposure Function (NEF), Policy Control Function (PCF), NF Repository Function (NRF), Unified Data Management (UDM) entity, AF, User Plane Function (UPF), Short Message Service Function (SMSF), Non-3GPP Interworking Function (N3IWF), Network Slice Selection Function (NSSF), and/or other like NR NFs. In such embodiments, the NG-RAN 110 may be connected with the 5GC 120 via an NG interface 113. In these embodiments, the NG interface 113 may be split into two parts, an NG-U interface 114, which carries traffic data between the RAN nodes 111 and a UPF, and the NG-C interface 115, which is a signaling interface between the RAN nodes 111 and AMFs. Additionally, the UPF within the 5GC 120 may perform packet routing, filtering, inspection, forwarding, etc., between the 5GC 120 and external networks such as a data network (DN) 130 via an IP interface 125. The DN 130 may represent one or more DNs including one or more Local Area DNs (LADNs), and may be an operator external public, a private PDN, an intra-operator PDN as discussed previously.

The CN 120 is shown to be communicatively coupled to PDN/DN 130 via an IP communications interface 125. The PDN/DN 130 may include one or more application servers (AS). The application server(s) (and the network element(s) 122) comprise one or more physical and/or virtualized systems for providing functionality (or services) to one or more clients (e.g., UEs 101) over a network. Such servers may include various computer devices with rack computing architecture component(s), tower computing architecture component(s), blade computing architecture component(s), and/or the like. The server(s) may represent a cluster of servers, a server farm, a cloud computing service, or other grouping or pool of servers, which may be located in one or more datacenters. The server(s) may also be connected to, or otherwise associated with one or more data storage devices (not shown). Generally, the AS(s) 130 offer applications or services that use IP/network resources. As examples, the server(s) may provide traffic management services, cloud computing services, content streaming services, immersive gaming experiences, social networking and/or microblogging services, one or more communication services (e.g., VoIP sessions, PTT sessions, group communication sessions, social networking services, etc.), and/or other like services for the UEs 101 via the CN 120.

The UE 101 may be configured to perform various RLM procedures. RLM refers to mechanisms used by the UE 101 for monitoring the DL radio link quality (RLQ) of a primary cell (PCell) for the purpose of indicating out-of-sync/in-sync status to higher layers. The term "a "Primary Cell" or "PCell" refers to a master cell group (MCG) cell, operating on a primary frequency, in which the UE 101 either performs an initial connection establishment procedure or initiates a connection re-establishment procedure. The UE 101 is not required to monitor the DL RLQ in DL BWPs other than the active DL BWP on the PCell. If the active DL BWP is the initial DL BWP and for synchronization signal blocks (SSBs) and CORESET multiplexing pattern 2 or 3, the UE 101 is expected to perform RLM using the associated SSB when the associated SSB index is provided by the parameter/IE RadioLinkMonitoringRS. The term "SSB" refers to a synchronization signal (SS)/PBCH block.

If the UE is configured with a Secondary Cell Group (SCG) (see e.g., TS 38.331), and the parameter rlf-TimersAndConstants is provided by higher layers DL RLQ of the Primary SCG Cell (PSCell) (also referred to as a "Primary Secondary Cell") of the SCG is monitored by the UE 101 for the purpose of indicating L1 indicators (e.g., out-of-sync/in-sync status) to higher layers. The UE 101 is not required to monitor the DL RLQ in DL BWPs other than the active DL BWP on the PSCell. When the UE 101 is configured for dual connectivity, an SCG is the subset of serving cells comprising the PSCell and zero or more secondary cells.

The UE 101 can be configured for each DL BWP of an SpCell (see e.g., 3GPP TS 38.321 v15.3.0 (2018-09)) with a set of resource indexes, through a corresponding set of RadioLinkMonitoringRS, for RLM by failureDetectionResources. The UE 101 is provided either a CSI-RS resource configuration index (e.g., CSI-RS-Index) or a SS/PBCH block index (e.g., ssb-Index). The UE 101 can be configured with up to NLR-RLM RadioLinkMonitoringRS for link recovery procedures, as described in subclause 6 of 3GPP TS 38.213 v15.3.0 (2018-09) (hereinafter "TS 38.213"), and for RLM. From the $N_{LR-RLM}$ RadioLinkMonitoringRS, up to $N_{RLM}$ RadioLinkMonitoringRS can be used for RLM depending on a maximum number $L_{max}$ of candidate SSBs per half frame as described in subclause 4.1 of TS 38.213, and up to two RadioLinkMonitoringRS can be used for link recovery procedures.

If the UE 101 is not provided RadioLinkMonitoringRS and the UE 101 is provided for PDCCH receptions TCI states that include one or more of a CSI-RS the UE 101 uses for RLM the RS provided for the active TCI state for PDCCH reception if the active TCI state for PDCCH reception includes only one RS; if the active TCI state for PDCCH reception includes two RS, the UE 101 expects that one RS has QCL-TypeD (See e.g., TS 38.214) and the UE 101 uses the RS with QCL-TypeD for RLM; the UE 101 does not expect both RS to have QCL-TypeD; the UE 101 is not required to use for RLM an aperiodic or semi-persistent RS. For $L_{max}=4$, the UE 101 selects the $N_{RLM}$ RS provided for active TCI states for PDCCH receptions in CORESETs associated with the search space sets in an order from the shortest monitoring periodicity. If more than one CORESETs are associated with search space sets having same monitoring periodicity, the UE 101 determines the order of the CORESET from the highest CORESET index as described in subclause 10.1 of TS 38.213. The UE 101 does not expect to use more than $N_{RLM}$ RadioLinkMonitoringRS for RLM when the UE 101 is not provided RadioLinkMonitoringRS. Values of $N_{LR-RLM}$ and $N_{RLM}$ for different values of $L_{max}$ are given by table 5-1.

TABLE 5-1

$N_{LR-RLM}$ and $N_{RLM}$ as a function of maximum number $L_{max}$ of SS/PBCH blocks per half frame

| $L_{max}$ | $N_{LR-RLM}$ | $N_{RLM}$ |
|---|---|---|
| 4 | 2 | 2 |
| 8 | 6 | 4 |
| 64 | 8 | 8 |

For a CSI-RS resource configuration, powerControlOffsetSS is not applicable and a UE expects to be provided only 'noCDM' from cdm-Type, only 'one' and 'three' from density, and only '1 port' from nrofPorts (see e.g., TS 38.214).

If the UE 101 is configured with multiple DL BWPs for a serving cell, the UE 101 performs RLM using the RS(s) corresponding to resource indexes provided by RadioLinkMonitoringRS for the active DL BWP or, if RadioLinkMonitoringRS is not provided for the active DL BWP, using the RS(s) provided for the active TCI state for PDCCH receptions in CORESETs on the active DL BWP.

In non-DRX mode operation, the physical layer in the UE 101 assesses once per indication period the radio link quality, evaluated over the previous time period defined in TS 38.133 against thresholds ($Q_{out}$ and $Q_{in}$) configured by rlmInSyncOutOJSyncThreshold. The UE 101 determines the indication period as the maximum between the shortest periodicity for RLM resources and 10 msec.

In DRX mode operation, the physical layer in the UE assesses once per indication period the radio link quality, evaluated over the previous time period defined in TS 38.133, against thresholds ($Q_{out}$ and $Q_{in}$) provided by rlmInSyncOutOJSyncThreshold. The UE 101 determines the indication period as the maximum between the shortest periodicity for RLM resources and the DRX period.

The PHY in the UE 101 indicates, in frames where the RLQ is assessed, out-of-sync to higher layers when the RLQ is worse than the threshold $Q_{out}$ for all resources in the set of resources for RLM. When the RLQ is better than the threshold $Q_{in}$ for any resource in the set of resources for RLM, the physical layer in the UE 101 indicates, in frames where the RLQ is assessed, in-sync to higher layers.

For RLM, the UE 101 monitors the DL RLQ based on the reference signal configured as RLM-RS resource(s) in order to detect the DL RLQ of a PCell and PSCell as specified in TS 38.213. An RLM-RS resource is a resource out of a set of resources configured for RLM by the higher layer parameter RLM-RS-List and/or the RadioLinkMonitoringConfig parameter/information element (IE) (see e.g., TS 38.331 and 3GPP TS 38.321 v15.3.0 (2018-09)) as defined in TS 38.213. The NW (e.g., RAN 110 or RAN node 111) provides a list of reference signals for detecting beam failure and/or cell level RLF. The limits of the reference signals that the NW can configure are specified in TS 38.213, table 5-1. The NW configures at most two detectionResources per BWP for the purpose beamFailure or both. If no RSs are provided for the purpose of beam failure detection, the UE performs beam monitoring based on the activated TCI-State for PDCCH as described in TS 38.213, clause 6. If no RSs are provided in this list for the purpose of RLF detection, the UE performs Cell-RLM based on the activated TCI-State of PDCCH as described in TS 38.213, clause 5. The NW ensures that the UE has a suitable set of reference signals for performing cell-RLM. The configured RLM-RS resources can be all SSBs, all channel state information reference signals (CSI-RSs), or a mix of SSBs and CSI-RSs. The UE 101 is not required to perform RLM outside the active DL BWP.

On each RLM-RS resource, the UE 101 estimates the DL RLQ and compares the estimated DL RLQ to the thresholds $Q_{out}$ and $Q_{in}$ for the purpose of monitoring DL RLQ of the cell. The threshold $Q_{out}$ is defined as the level at which the DL radio link cannot be reliably received and shall correspond to the out-of-sync block error rate ($BLER_{out}$) as defined in Table 8.1.1-1 of 3GPP TS 38.133 v15.3.0 (2018-10) (hereinafter "TS 38.133"). For SSB based RLM, $Q_{out\_SSB}$ is derived based on the hypothetical PDCCH transmission parameters listed in Table 8.1.2.1-1 of TS 38.133. For CSI-RS based RLM, $Q_{out\_CSI-RS}$ is derived based on the hypothetical PDCCH transmission parameters listed in Table 8.1.3.1-1 of TS 38.133. The threshold $Q_{in}$ is defined as the level at which the DL RLQ can be received with significantly higher reliability than at $Q_{out}$ and shall correspond to the in-sync block error rate ($BLER_{in}$) as defined in Table 8.1.1-1 of TS 38.133. For SSB based RLM, $Q_{in\_SSB}$ is derived based on the hypothetical PDCCH transmission parameters listed in Table 8.1.2.1-2 of TS 38.133. For CSI-RS based RLM, $Q_{in\_CSI-RS}$ is derived based on the hypothetical PDCCH transmission parameters listed in Table 8.1.3.1-2 of TS 38.133.

The out-of-sync block error rate ($BLER_{out}$) and in-sync block error rate ($BLER_{in}$) are determined from the NW configuration via parameter rlmInSyncOutOJSyncThreshold signaled by higher layers. When UE is not configured with rlmInSyncOutOJSyncThreshold from the NW, the UE 101 determines out-of-sync and in-sync block error rates from Configuration #0 in table 8.1.1-1 of TS 38.133 as default.

The UE 101 is able to monitor up to $N_{RLM}$ RLM-RS resources of the same or different types in each corresponding carrier frequency range, depending on a maximum number $L_{max}$ of candidate SSBs per half frame according to TS 38.213, where $N_{RLM}$ is specified in Table 8.1.1-2 of TS 38.133, and meet the requirements as specified in clause 8.1 of TS 38.133. The UE 101 is not required to meet the requirements in clause 8.1 of TS 38.133 if RLM-RS is not configured and no TCI state for PDCCH is activated.

The PDCCH transmission parameters for out-of-sync evaluation of SSB based RLM are described by table 8.1.2.1-1 of TS 38.133, and the PDCCH transmission parameters for in-sync evaluation of SSB based RLM are described by table 8.1.2.1-2 of TS 38.133. The minimum requirements for each SSB based RLM-RS resource configured for a PCell or PSCell (provided that the SSB configured for RLM are actually transmitted within a UE active DL BWP during the entire evaluation period specified in clause 8.1.2.2 of TS 38.133) are as follows.

The UE 101 is able to evaluate whether the DL RLQ on the configured RLM-RS resource estimated over the last $T_{Evaluate\_out\_SSB}$ [ms] period becomes worse than the threshold $Q_{out\_SSB}$ within $T_{Evalvate\_out\_SSB}$ [ms] evaluation period. The UE 101 is able to evaluate whether the DL RLQ on the configured RLM-RS resource estimated over the last $T_{Evaluate\_in\_SSB}$ [ms] period becomes better than the threshold $Q_{in\_SSB}$ within $T_{Evaluate\_in\_SSB}$ [ms] evaluation period. $T_{Evaluate\_out\_SSB}$ and $T_{Evaluate\_in\_SSB}$ are defined in Table 8.1.2.2-1 for FR1; $T_{Evaluate\_out\_SSB}$ and $T_{Evaluate\_in\_SSB}$ are defined in Table 8.1.2.2-2 for FR2 with scaling factor N=8.

For FR1, $$P = \frac{1}{1 - \frac{T_{SSB}}{MRGP}},$$

when in the monitored cell there are measurement gaps configured for intra-frequency, inter-frequency or inter-RAT measurements, and these measurement gaps are overlapping with some but not all occasions of the SSB; and P=1 when in the monitored cell there are no measurement gaps overlapping with any occasion of the SSB.

For FR2, $$P = \frac{1}{1 - \frac{T_{SSB}}{T_{SMTCperiod}}},$$

when RLM-RS is not overlapped with measurement gap and the RLM-RS is partially overlapped with SMTC occasion ($T_{SSB} < T_{SMTCperiod}$). P is $P_{sharing\ factor}$ when the RLM-RS is not overlapped with measurement gap and RLM-RS is fully overlapped with SMTC period ($T_{SSB} = T_{SMTCperiod}$).

$$P = \frac{1}{1 - \frac{T_{SSB}}{MRGP} - \frac{T_{SSB}}{T_{SMTC_{period}}}},$$

when me KLM-RS is partially overlapped with measurement gap and the RLM-RS is partially overlapped with SMTC occasion ($T_{SSB} < T_{SMTCperiod}$) and SMTC occasion is not overlapped with measurement gap, and $T_{SMTCperiod} \neq MRGP$ or $T_{SMTCperiod} = MRGP$ and $T_{SSB} < 0.5 * T_{SMTCperiod}$.

$$P = \frac{P_{sharingfactor}}{1 - \frac{T_{SSB}}{MRGP}},$$

when the RLM-RS is partially overlapped with measurement gap and the RLM-RS is partially overlapped with SMTC occasion ($T_{SSB} < T_{SMTCperiod}$) and SMTC occasion is not overlapped with measurement gap and $T_{SMTCperiod} = MRGP$ and $T_{SSB} < T_{SMTCperiod}$.

$$P = \frac{1}{1 - \frac{T_{SSB}}{Min(MRGP, T_{SMTCperiod})}},$$

when the RLM-RS is partially overlapped with measurement gap and the RLM-RS is partially overlapped with SMTC occasion ($T_{SSB} < T_{SMTCperiod}$) and SMTC occasion is partially or fully overlapped with measurement gap.

$$P = \frac{P_{sharingfactor}}{1 - \frac{T_{SSB}}{MRGP}},$$

when the KLM-KS is partially overlapped with measurement gap and the RLM-RS is fully overlapped with SMTC occasion ($T_{SSB}=T_{SMTCperiod}$) and SMTC occasion is partially overlapped with measurement gap ($T_{SMTCperiod}$<MGRP). Additionally, $P_{sharing\ factor}=1$ if all of the reference signals configured for RLM outside measurement gap are not fully overlapped by intra-frequency SMTC occasions, or if all of the reference signal configured for RLM outside measurement gap and fully-overlapped by intra-frequency SMTC occasions are not overlapped by with the SSB symbols indicated by SSB-ToMeasure and 1 symbol before each consecutive SSB symbols indicated by SSB-ToMeasure and 1 symbol after each consecutive SSB symbols indicated by SSB-ToMeasure, given that SSB-ToMeasure is configured; otherwise, $P_{sharing\ factor}=3$.

If the high layer in TS 38.331 signaling of smtc2 is present, $T_{SMTCperiod}$ follows smtc2; Otherwise $T_{SMTCperiod}$ follows smtc1. Longer evaluation period would be expected if the combination of RLM-RS, SMTC occasion and measurement gap configurations does not meet previous conditions.

8.1.3.1-1 of TS 38.133, and the PDCCH transmission parameters for in-sync evaluation of SCI-RS based RLM are described by table 8.1.3.1-2 of TS 38.133. The minimum requirements for each CSI-RS based RLM-RS resource configured for PCell or PSCell (provided that the CSI-RS configured for RLM are actually transmitted within a UE active DL BWP during the entire evaluation period specified in clause 8.1.3.2 of TS 38.133) are as follows.

The UE 101 is not expected to perform RLM measurements on the CSI-RS configured as RLM-RS if the CSI-RS is not in the active TCI state of any CORESET configured in the UE active BWP.

The UE 101 is able to evaluate whether the DL RLQ on the configured RLM-RS resource estimated over the last $T_{Evaluate\_out\_CSI-RS}$ [ms] period becomes worse than the threshold $Q_{out\_CSI-RS}$ within $T_{Evaluate\_out\_CSI-RS}$ [ms] evaluation period. The UE 101 is able to evaluate whether the DL RLQ on the configured RLM-RS resource estimated over the last $T_{Evaluate\_in\_CSI-RS}$ [ms] period becomes better than

TABLE 8.1.2.2-1

Evaluation period $T_{Evaluate\_out\_SSB}$ and $T_{Evaluate\_in\_SSB}$ for FR1

| Configuration | $T_{Evaluate\_out\_SSB}$ (ms) | $T_{Evaluate\_in\_SSB}$ (ms) |
|---|---|---|
| no DRX | Max(200, Ceil(10*P))*$T_{SSB}$) | Max(100, Ceil(5*P)*$T_{SSB}$) |
| DRX cycle ≤ 320 | Max(200, Ceil(15*P)*Max($T_{DRX}$, $T_{SSB}$)) | Max(100, Ceil(7.5*P)*Max($T_{DRX}$, $T_{SSB}$)) |
| DRX cycle > 320 | Ceil(10*P)*$T_{DRX}$ | Ceil(5*P)*$T_{DRX}$ |

NOTE:
$T_{SSB}$ is the periodicity of the SSB configured for RLM. $T_{DRX}$ is the DRX cycle length.

TABLE 8.1.2.2-2

Evaluation period $T_{Evaluate\_out\_SSB}$ and $T_{Evaluate\_in\_SSB}$ for FR2

| Configuration | $T_{Evaluate\_out\_SSB}$ (ms) | $T_{Evaluate\_in\_SSB}$ (ms) |
|---|---|---|
| no DRX | Max(200, Ceil(10*P*N)*$T_{SSB}$) | Max(100, Ceil(5*P*N)*$T_{SSB}$) |
| DRX cycle ≤ 320 | Max(200, Ceil(15*P*N)*Max($T_{DRX}$, $T_{SSB}$)) | Max(100, Ceil(7.5*P*N)*Max($T_{DRX}$, $T_{SSB}$)) |
| DRX cycle > 320 | Ceil(10*P*N)*$T_{DRX}$ | Ceil(5*P*N)*$T_{DRX}$ |

NOTE:
$T_{SSB}$ is the periodicity of the SSB configured for RLM. $T_{DRX}$ is the DRX cycle length.

The UE 101 is capable of measuring SSB for RLM without measurement gaps. The UE 101 also perform the SSB measurements with the following measurement restrictions: for FR1, when the SSB for RLM is in the same OFDM symbol as CSI-RS for RLM, BFD, Candidate Beam Detection (CBD) or L1-Reference Signal Received Power (RSRP) measurement; and if the SSB and CSI-RS have same SCS, the UE 101 is able to measure the SSB for RLM without any restriction; if the SSB and CSI-RS have a different SCS, and if the UE 101 supports simultaneousRxDataSSB-DiffNumerology, the UE 101 is able to measure the SSB for RLM without any restriction; if the UE 101 does not support simultaneousRxDataSSB-DiffNumerology, the UE 101 measures one of, but not both, SSB for RLM and CSI-RS. A longer measurement period for SSB based RLM is expected, but not required. For FR2, when the SSB for RLM is in the same OFDM symbol as CSI-RS for RLM, BFD, CBD or L1-RSRP measurement, the UE 101 measures one of, but not both, SSB for RLM and CSI-RS. A longer measurement period for SSB based RLM is expected, but not required.

The PDCCH transmission parameters for out-of-sync evaluation of CSI-RS based RLM are described by table the threshold $Q_{in\_CSI-RS}$ within $T_{Evaluate\_in\_CSI-RS}$ [ms] evaluation period. $T_{Evaluate\_out\_CSI-RS}$ and $T_{Evaluate\_in\_CSI-RS}$ are defined in Table 8.1.3.2-1 of TS 38.133 for FR1. $T_{Evaluate\_out\_CSI-RS}$ and $T_{Evaluate\_in\_CSI-RS}$ are defined in Table 8.1.3.2-2 of TS 38.133 for FR2 with scaling factor N=1.

The requirements of $T_{Evaluate\_out\_CSI-RS}$ and $T_{Evaluate\_in\_CSI-RS}$ apply provided that the CSI-RS for RLM is not in a resource set configured with repetition ON. The requirements do not apply when the CSI-RS resource in the active TCI state of CORESET is the same CSI-RS resource for RLM and the TCI state information of the CSI-RS resource is not given, wherein the TCI state information means QCL Type-D to SSB for L1-RSRP or CSI-RS with repetition ON.

For FR1, $$P = \frac{1}{1 - \frac{T_{CSI-RS}}{MRGP}},$$

when in the monitored cell there are measurement gaps configured for intra-frequency, inter-frequency or inter-RAT measurements, and these measurement gaps are overlapping with some but not all occasions of the CSI-RS; and P=1 when in the monitored cell there are no measurement gaps overlapping with any occasion of the CSI-RS.

For FR2, P=1, when the RLM-RS is not overlapped with measurement gap and also not overlapped with SMTC occasion.

$$P = \frac{1}{1 - \frac{T_{CSI-RS}}{MRGP}},$$

when the RLM-RS is partially overlapped with measurement gap and the RLM-RS is not overlapped with SMTC occasion ($T_{CSI-RS}$<MGRP).

$$P = \frac{1}{1 - \frac{T_{CSI-RS}}{T_{SMTCperiod}}},$$

when the RLM-RS is not overlapped with measurement gap and the RLM-RS is partially overlapped with SMTC occasion ($T_{CSI-RS}$<$T_{SMTCperiod}$). P=3, when the RLM-RS is not overlapped with measurement gap and RLM-RS is fully overlapped with SMTC occasion ($T_{CSI-RS}$=$T_{SMTCperiod}$).

$$P = \frac{1}{1 - \frac{T_{CSI-RS}}{MRGP} - \frac{T_{CSI-RS}}{T_{SMTCperiod}}},$$

when the KLM-RS is partially overlapped with measurement gap and the RLM-RS is partially overlapped with SMTC occasion ($T_{CSI-RS}$<$T_{SMTCperiod}$) and SMTC occasion is not overlapped with measurement gap, and $T_{SMTCperiod}$≠MGRP or $T_{SMTCperiod}$=MGRP and $T_{CSI-RS}$<0.5*$T_{SMTCperiod}$.

$$P = \frac{3}{1 - \frac{T_{CSI-RS}}{MRGP}},$$

when the KLM-KS is partially overlapped with measurement gap and the RLM-RS is partially overlapped with SMTC occasion ($T_{CSI-RS}$<$T_{SMTCperiod}$) and SMTC occasion is not overlapped with measurement gap and $T_{SMTCperiod}$=MGRP and $T_{CSI-RS}$=0.5*$T_{SMTCperiod}$.

$$P = \frac{1}{1 - \frac{T_{CSI-RS}}{\text{Min}(MRGP, T_{SMTCperiod})}},$$

when the RLM-RS is partially overlapped with measurement gap and the RLM-RS is partially overlapped with SMTC occasion ($T_{CSI-RS}$<$T_{SMTCperiod}$) and SMTC occasion is partially or fully overlapped with measurement gap.

$$P = \frac{3}{1 - \frac{T_{CSI-RS}}{MRGP}},$$

when the RLM-RS is partially overlapped with measurement gap and the RLM-RS is fully overlapped with SMTC occasion ($T_{CSI-RS}$=$T_{SMTCperiod}$) and SMTC occasion is partially overlapped with measurement gap ($T_{SMTCperiod}$<MGRP). If the high layer in TS 38.331 signaling of smtc2 is present, $T_{SMTCperiod}$ follows smtc2; Otherwise $T_{SMTCperiod}$ follows smtc1. The overlap between CSI-RS for RLM and SMTC means that CSI-RS based RLM is within the SMTC window duration. A longer evaluation period would be expected if the combination of RLM-RS, SMTC occasion and measurement gap configurations does not meet previous conditions.

The values of $M_{out}$ and $M_{in}$ used in Table 8.1.3.2-1 and Table 8.1.3.2-2 are defined as: $M_{out}$=20 and $M_{in}$=10, if the CSI-RS resource configured for RLM is transmitted with higher layer CSI-RS parameter density (see e.g., 3GPP TS 38.211 v15.3.0 (2018-09), clause 7.4.1) set to 3 and over the bandwidth ≥24 PRBs.

TABLE 8.1.3.2-1

Evaluation period $T_{Evaluate\_out\_CSI-RS}$ and $T_{Evaluate\_in\_CSI-RS}$ for FR1

| Configuration | $T_{Evaluate\_out\_CSI-RS}$ (ms) | $T_{Evaluate\_in\_CSI-RS}$ (ms) |
|---|---|---|
| no DRX | Max(200, Ceil($M_{out}$ × P) × $T_{CSI-RS}$) | Max(100, Ceil($M_{in}$ × P) × $T_{CSI-RS}$) |
| DRX ≤ 320 ms | Max(200, Ceil(1.5 × $M_{out}$ × P) × Max($T_{DRX}$, $T_{CSI-RS}$)) | Max(100, Ceil(1.5 × $M_{in}$ × P) × Max($T_{DRX}$, $T_{CSI-RS}$)) |
| DRX > 320 ms | Ceil($M_{out}$ × P) × $T_{DRX}$ | Ceil($M_{in}$ × P) × $T_{DRX}$ |

NOTE:

$T_{CSI-RS}$ is the periodicity of the CSI-RS resource configured for RLM. The requirements in this table apply for $T_{CSI-RS}$ equal to 5 ms, 10 ms, 20 ms or 40 ms. $T_{DRX}$ is the DRX cycle length.

TABLE 8.1.3.2-2

Evaluation period $T_{Evaluate\_out\_CSI-RS}$ and $T_{Evaluate\_in\_CSI-RS}$ for FR2

| Configuration | $T_{Evaluate\_out\_CSI-RS}$ (ms) | $T_{Evaluate\_in\_CSI-RS}$ (ms) |
|---|---|---|
| no DRX | Max(200, Ceil($M_{out}$ × P × N) × $T_{CSI-RS}$) | Max(100, Ceil ($M_{in}$ × P × N) × $T_{CSI-RS}$) |

TABLE 8.1.3.2-2-continued

Evaluation period $T_{Evaluate\_out\_CSI-RS}$ and $T_{Evaluate\_in\_CSI-RS}$ for FR2

| Configuration | $T_{Evaluate\_out\_CSI-RS}$ (ms) | $T_{Evaluate\_in\_CSI-RS}$ (ms) |
|---|---|---|
| DRX ≤ 320 ms | Max(200, Ceil(1.5 × $M_{out}$ × P × N) × Max($T_{DRX}$, $T_{CSI-RS}$)) | Cax(100, Ceil(1.5 × $M_{in}$ × P × N) × Cax($T_{DRX}$, $T_{CSI-RS}$)) |
| DRX > 320 ms | Ceil($M_{out}$ × P × N) × $T_{DRX}$ | Ceil($M_{in}$ × P × N) × $T_{DRX}$ |

NOTE:
$T_{CSI-RS}$ is the periodicity of the CSI-RS resource configured for RLM. The requirements in this table apply for $T_{CSI-RS}$ equal to 5 ms, 10 ms, 20 ms or 40 ms. $T_{DRX}$ is the DRX cycle length.

The UE 101 is capable of measuring CSI-RS for RLM without measurement gaps. The UE 101 performs the CSI-RS measurements with the following measurement restrictions: For both FR1 and FR2, when the CSI-RS for RLM is in the same OFDM symbol as SSB for RLM, BFD, CBD or L1-RSRP measurement, UE is not required to receive CSI-RS for RLM in the PRBs that overlap with an SSB. For FR1, when the SSB for RLM, BFD, CBD, or L1-RSRP measurement is within the active BWP and has same SCS than CSI-RS for RLM, the UE shall be able to perform CSI-RS measurement without restrictions. For FR1, when the SSB for RLM, BFD, CBD or L1-RSRP measurement is within the active BWP and has different SCS than CSI-RS for RLM, the UE shall be able to perform CSI-RS measurement with restrictions according to its capabilities: if the UE supports simultaneousRxDataSSB-DiffNumerology the UE 101 is able to perform CSI-RS for RLM measurement without restrictions; and/or if the UE 101 does not support simultaneousRxDataSSB-DiffNumerology, UE 101 measures one of but not both CSI-RS for RLM and SSB. A longer measurement period for CSI-RS based RLM is expected, but not required. For FR1, when the CSI-RS for RLM is in the same OFDM symbol as another CSI-RS for RLM, BFD, CBD or L1-RSRP measurement, the UE 101 able to measure the CSI-RS for RLM without any restriction. For FR2, when the CSI-RS for RLM is in the same OFDM symbol as SSB for RLM, BFD, or L1-RSRP measurement, or in the same symbol as SSB for CBD when beam failure is detected, the UE 101 measures one of but not both CSI-RS for RLM and SSB. A longer measurement period for CSI-RS based RLM is expected, but not required. For FR2, when the CSI-RS for RLM is in the same OFDM symbol as another CSI-RS for RLM, BFD, CBD or L1-RSRP measurement, in the following cases, the UE 101 measures one of but not both CSI-RS for RLM and the other CSI-RS. Longer measurement period for CSI-RS based RLM is expected, and no requirements are defined: the CSI-RS for RLM or the other CSI-RS in a resource set configured with repetition ON; the other CSI-RS is configured in q1 and beam failure is detected; or the two CSI-RSes are not QCL-ed with respect to (w.r.t.) QCL-TypeD, or the QCL information is not known to UE; otherwise, UE 101 is able to measure the CSI-RS for RLM without any restriction.

When the DL RLQ on all the configured RLM-RS resources is worse than $Q_{out}$, the layer 1 (L1) of the UE 101 sends an out-of-sync indication for the cell to the higher layers. When the DL RLQ on at least one of the configured RLM-RS resources is better than $Q_{in}$, L1 of the UE shall send an in-sync indication for the cell to the higher layers. The out-of-sync and in-sync evaluations for the configured RLM-RS resources shall be performed as specified in clause 5 in TS 38.213. Two successive indications from L1 are separated by at least a L1 indication interval ($T_{Indication\_interval}$).

When DRX is not used, $T_{Indication\_interval}$ is max(10 ms, $T_{RLM-RS,M}$), where $T_{RLM,M}$ is the shortest periodicity of all configured RLM-RS resources for the monitored cell, which corresponds to $T_{SSB}$ specified in clause 8.1.2 of TS 38.113 if the RLM-RS resource is SSB, or $T_{CSI-RS}$ specified in clause 8.1.3 of TS 38.133 if the RLM-RS resource is CSI-RS.

In case DRX is used, $T_{Indication\_interval}$ is Max(10 ms, 1.5*DRX cycle length, 1.5*$T_{RLM-RS,M}$) if DRX cycle_length is less than or equal to 320 ms, and $T_{Indication\_interval}$ is DRX cycle length if DRX cycle_length is greater than 320 ms. Upon start of T310 timer as specified in TS 38.331, the UE 101 monitors the configured RLM-RS resources for recovery using the evaluation period and layer 1 indication interval corresponding to the no DRX mode until the expiry or stop of T310 timer.

Embodiments herein reconsider and/or enhance the evaluation period and L1 indication interval to further conserve UE power consumption in different scenarios, which may be based on various conditions, criteria, parameters, UE status, and/or the like. For example, the different scenarios may be based on UE mobility state (e.g., stationary, low mobility, medium mobility, or high mobility states), RRC state (e.g., RRC_IDLE, RRCE_INACTIVE, or RRC_CONNECTED states), Registration Management (RM) and/or Connection Management (CM) state and/or related information (see e.g., 3GPP TS 23.501 v15.3.0 (2019-09)), Session Management (SM) state and/or related information (see e.g., 3GPP TS 23.501 v15.3.0 (2019-09)); UE capabilities such as those discussed in section 6.3.3 of TS 38.331 and/or sections 8.1 and 8.5 of TS 38.213; subscription data; and/or the like, and/or any combination thereof. According to various embodiments, the UE 101 uses a scaling factor to scale (e.g., extend or reduce/shorten) the RLM evaluation period (e.g., $T_{Evaluate\_out\_SSB}$, $T_{Evaluate\_in\_SSB}$, $T_{Evaluate\_out\_CSI-RS}$, and/or $T_{Evaluate\_in\_CSI-RS}$) and/or the L1 indication interval (e.g., $T_{Indication\_interval}$). The scaling factor defines the scaling to be applied to the requirements for evaluating the DL RLQ and/or the requirements for sending out the L1 indications (e.g., the out-of-sync indication and/or the in-sync indication) to higher layers. In embodiments, the UE 101 applies the scaling factor to the predefined or predetermined RLM evaluation period and/or the predefined or predetermined L1 indication interval for example, by multiplying or adding the scaling factor to a calculated RLM evaluation period and/or L1 indication interval.

Different scaling factors may be used for different scenarios, for example, a first scaling factor may be used when the UE is in a low mobility state, a second scaling factor may be used when the UE is in a medium mobility state that is greater than the low mobility state, and a third scaling factor may be used when the UE is in a high mobility state that is greater than the medium mobility state. In some embodiments, a single or same scaling factor is used to scale both the RLM evaluation period and the L1 indication interval. In some embodiments, different scaling factors may be used for the RLM evaluation period and the L1 indication interval, for example, a first scaling factor may be used to scale the RLM evaluation period and a second scaling factor may be used to scale the L1 indication interval. In some embodiments, individual scaling factors may be used for different evaluation periods. In a first example, a first scaling factor may be used to scale $T_{Evaluate\_out\_SSB}$ and $T_{Evaluate\_in\_SSB}$, and a second scaling factor may be used to scale $T_{Evaluate\_out\_CSI-RS}$ and $T_{Evaluate\_in\_CSI-RS}$. In a second example, a first scaling factor may be used to scale $T_{Evaluate\_out\_SSB}$, a second scaling factor may be used to scale $T_{Evaluate\_in\_SSB}$, a third scaling factor may be used to scale $T_{Evaluate\_out\_CSI-RS}$, and a fourth scaling factor may be used to scale $T_{Evaluate\_in\_CSI-RS}$. The aforementioned embodiments and examples are also applicable when scaling factor indexes are used. The scaling factor(s) or a scaling factor index(es) may be signaled to the UE 101 by higher layer signaling, in a suitable RRC message or the like. The scaling factor index is an index that the UE 101 may use to find or otherwise determine the numeric value of the scaling factor.

According to a first embodiment, the NW (e.g., RAN 110 or RAN node 111) indicates a scaling factor or scaling factor index to the UE 101 to extend or shorten an RLM evaluation period. In the first embodiment, the UE 101 uses the scaling factor to extend or shorten its RLM evaluation period accordingly. For example, the NW may determine a UE 101 status based on the aforementioned criteria, conditions, etc., and may determine an appropriate scaling factor or scaling factor index to scale the RLM evaluation period in order to save/conserve UE power. In this example, the UE 101 receives the scaling factor or scaling factor index from the NW, and follows the NW indication to scale its RLM evaluation period by using the indicated scaling factor or scaling factor index. In the first embodiment, a scaling factor X may be applied to the evaluation periods as shown by tables 8.1.2.2-1x, 8.1.2.2-2x, 8.1.3.2-1x, and 8.1.3.2-2x.

TABLE 8.1.2.2-1x

Evaluation period $T_{Evaluate\_out\_SSB}$ and $T_{Evaluate\_in\_SSB}$ for FR1

| Configuration | $T_{Evaluate\_out\_SSB}$ (ms) | $T_{Evaluate\_in\_SSB}$ (ms) |
|---|---|---|
| no DRX | X*Max(200, Ceil(10*P)*$T_{SSB}$) | X*Max(100, Ceil(5*P)*$T_{SSB}$) |
| DRX cycle ≤ 320 | X*Max(200, Ceil(15*P)*Max($T_{DRX}$, $T_{SSB}$)) | X*Max(100, Ceil(7.5*P)*Max($T_{DRX}$, $T_{SSB}$)) |
| DRX cycle > 320 | X*Ceil(10*P)*$T_{DRX}$ | X*Ceil(5*P)*$T_{DRX}$ |

NOTE:
$T_{SSB}$ is the periodicity of the SSB configured for RLM. $T_{DRX}$ is the DRX cycle length.

TABLE 8.1.2.2-2x

Evaluation period $T_{Evaulate\_out\_SSB}$ and $T_{Evaulate\_in\_SSB}$ for FR2

| Configuration | $T_{Evaulate\_out\_SSB}$ (ms) | $T_{Evaulate\_in\_SSB}$ (ms) |
|---|---|---|
| no DRX | X*Max(200, Ceil(10*P*N)*$T_{SSB}$) | X*Max(100, Ceil(5*P*N)*$T_{SSB}$) |
| DRX cycle ≤ 320 | X*Max(200, Ceil(15*P*N)*Max($T_{DRX}$, $T_{SSB}$)) | X*Max(100, Ceil(7.5*P*N)*Max($T_{DRX}$, $T_{SSB}$)) |
| DRX cycle > 320 | X*Ceil(10*P*N)*$T_{DRX}$ | X*Ceil(5*P*N)*$T_{DRX}$ |

NOTE:
$T_{SSB}$ is the periodicity of the SSB configured for RLM. $T_{DRX}$ is the DRX cycle length.

TABLE 8.1.3.2-1x

Evaluation period $T_{Evaulate\_out\_CSI-RS}$ and $T_{Evaulate\_in\_CSI-RS}$ for FR1

| Configuration | $T_{Evaulate\_out\_CSI-RS}$ (ms) | $T_{Evaulate\_in\_CSI-RS}$ (ms) |
|---|---|---|
| no DRX | X*Max(200, Ceil($M_{out}$ × P) × $T_{CSI-RS}$) | X*Max(100, Ceil($M_{in}$ × P) × $T_{CSI-RS}$) |
| DRX ≤ 320 ms | X*Max(200, Ceil(1.5 × $M_{out}$ × P) × Max($T_{DRX}$, $T_{CSI-RS}$)) | X*Max(100, Ceil(1.5 × $M_{in}$ × P) × Max($T_{DRX}$, $T_{CSI-RS}$)) |
| DRX > 320 ms | X*Ceil($M_{out}$ × P) × $T_{DRX}$ | X*Ceil($M_{in}$ × P) × $T_{DRX}$ |

NOTE:
$T_{CSI-RS}$ is the periodicity of the CSI-RS resource configured for RLM. The requirements in this table apply for $T_{CSI-RS}$ equal to 5 ms, 10 ms, 20 ms or 40 ms. $T_{DRX}$ is the DRX cycle length.

TABLE 8.1.3.2-2x

Evaluation period $T_{Evaluate\_out\_CSI-RS}$ and $T_{Evaluate\_in\_CSI-RS}$ for FR2

| Configuration | $T_{Evaluate\_out\_CSI-RS}$ (ms) | $T_{Evaluate\_in\_CSI-RS}$ (ms) |
|---|---|---|
| no DRX | X*Max(200, Ceil ($M_{out}$ × P × N) × $T_{CSI-RS}$) | X*Max(100, Ceil($M_{in}$ × P × N) × $T_{CSI-RS}$) |
| DRX ≤ 320 ms | X*Max(200, Ceil (1.5 × $M_{out}$ × P × N) × Max($T_{DRX}$, $T_{CSI-RS}$)) | X*Cax(100, Ceil(1.5 × $M_{in}$ × P × N) × Cax($T_{DRX}$, $T_{CSI-RS}$)) |
| DRX > 320 ms | X*Ceil($M_{out}$ × P × N) × $T_{DRX}$ | X*Ceil($M_{in}$ × P × N) × $T_{DRX}$ |

NOTE:
$T_{CSI-RS}$ is the periodicity of the CSI-RS resource configured for RLM. The requirements in this table apply for $T_{CSI-RS}$ equal to 5 ms, 10 ms, 20 ms or 40 ms. $T_{DRX}$ is the DRX cycle length.

According to a second embodiment, the NW indicates a scaling factor or scaling factor index to the UE 101 to scale (e.g., extend or shorten) the RLM L1 indication interval. In the second embodiment, the UE 101 uses the scaling factor to extend or shorten its RLM L1 indication interval accordingly. For example, the NW may determine the UE 101 status based on various status, conditions, criteria, capabilities, etc., such as those discussed previously. In this example, the NW may determine a scaling factor or scaling factor index to scale the UE 101 RLM L1 indication interval to save/conserve UE power, and signals/indicates the scaling factor or scaling factor index to the UE 101. In this example, the UE follows the NW indication to scale its RLM L1 indication interval by using the indicated scaling factor or scaling factor index. In the second embodiment, the scaling factor X may be applied to the minimum requirements for the L1 indication as follows:

When DRX is not used $T_{Indication\_interval}$ is $X*\max(10\ ms, T_{RLM-RS,M})$, where $T_{RLM,M}$ is the shortest periodicity of all configured RLM-RS resources for the monitored cell, which corresponds to $T_{SSB}$ specified in section 8.1.2 of TS 38.133 if the RLM-RS resource is SSB, or $T_{CSI-RS}$ specified in section 8.1.3 of TS 38.133 if the RLM-RS resource is CSI-RS. In case DRX is used, $T_{Indication\_interval}$ is $X*\max(10\ ms, 1.5*T_{RLM-RS,M})$ if DRX cycle_length is less than or equal to 320 ms, and $T_{Indication\_interval}$ is DRX cycle length if DRX cycle_length is greater than 320 ms.

According to a third embodiment, the NW allows or otherwise instructs the UE 101 to scale (e.g., extend or shorten) the RLM evaluation period. In the third embodiment, the UE 101 decides or determines the scaling factor to scale (e.g., extend or shorten) its RLM evaluation period based on an indication or configuration received from the NW. For example, the NW may configure the UE 101 with the capability or permission to scale its RLM evaluation period based on some triggering event(s) (e.g., one or more of the aforementioned conditions, criteria, status, etc.), and the NW configures the UE 101 accordingly (e.g., via higher layer signaling or the like). In this example, the UE 101 decides or determines the scaling factor to scale the RLM evaluation period when the configured trigger event(s) is/are detected.

In the third embodiment, when the UE 101 decides to scale its RLM evaluation period, the UE 101 may report scaling information to the NW. The scaling information may include, for example, the scaled RLM evaluation period, the scaling factor (or scaling factor index), the detected triggering event(s), and/or any other scaling-related information. The scaling information may be reported in a suitable message, such as an RLF report, an RRC reconfiguration establishment message, and/or the like.

According to a fourth embodiment, the NW allows or otherwise instructs the UE 101 to adjust (e.g., extend or shorten) its L1 indication interval. In the fourth embodiment, the UE 101 decides or determines the scaling factor to scale (e.g., extend or shorten) its L1 indication interval based on an indication or configuration received from the NW. For example, the NW may configure the UE 101 with the capability or permission to scale its RLM L1 indication interval based on some triggering event (e.g., one or more of the aforementioned conditions, criteria, status, etc.), and the NW configures the UE 101 accordingly (e.g., via higher layer signaling or the like). The triggering event for scaling the L1 indication interval may be the same or different than the triggering event(s) for scaling the RLM evaluation period discussed previously. In this example, the UE 101 decides or determines the scaling factor to scale the RLM L1 indication interval when the configured trigger event(s) is/are detected.

In the fourth embodiment, when the UE 101 decides to scale its RLM L1 indication interval, the UE 101 may report scaling information to the NW. The scaling information may include, for example, the scaled RLM L1 indication interval, the scaling factor (or scaling factor index), the detected triggering event(s), and/or any other scaling-related information. The scaling information may be reported in a suitable message, such as an RLF report, an RRC reconfiguration establishment message, and/or the like. The scaling information for scaling the L1 indication interval may be the same or different than the scaling information for scaling the RLM evaluation period discussed previously, and may be reported in the same or different message than the message used to convey the RLM evaluation period scaling information.

In the third and fourth embodiments, the trigger events may be any suitable event, such as entering or transitioning to a certain mobility state based on a determined MSE; entering or transitioning to a certain RRC, RM, CM, and/or SM state; one or more signal strength measurements, signal quality measurements, and/or other like measurements; any one or more of the measurement reporting events A1-A6 or B1-B2 as discussed in section 5.5.4 of TS 38.331; and/or any other triggering events or combinations thereof. The signal strength, signal quality, and/or other measurements may include, for example, BW measurements, network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a RAN node 111 reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, CSI-RSs, SSBs, and/or of various beacon signals/frames, Fast Initial Link Setup (FILS) discovery frames, or probe response frames for IEEE 802.11 WLAN/WiFi networks. Other measurements may be additionally or alternatively used, such as those discussed in 3GPP TS 36.214 v15.3.0 (2018-09), 3GPP TS 38.215 v15.3.0 (2018-09), IEEE 802.11, Part 11: "Wireless LAN Medium Access Control (MAC) and Physical Layer (PHY) specifications, IEEE Std.", and/or the like.

Example Systems and Implementations

Each of the UEs 101, RAN nodes 111, AP 106, network element(s) 122, application servers 130, and/or any other device or system discussed previously with respect to FIGS. 1-7 may include various hardware and/or software elements, such as those discussed infra with respect to FIGS. 2-4.

Figure 2:
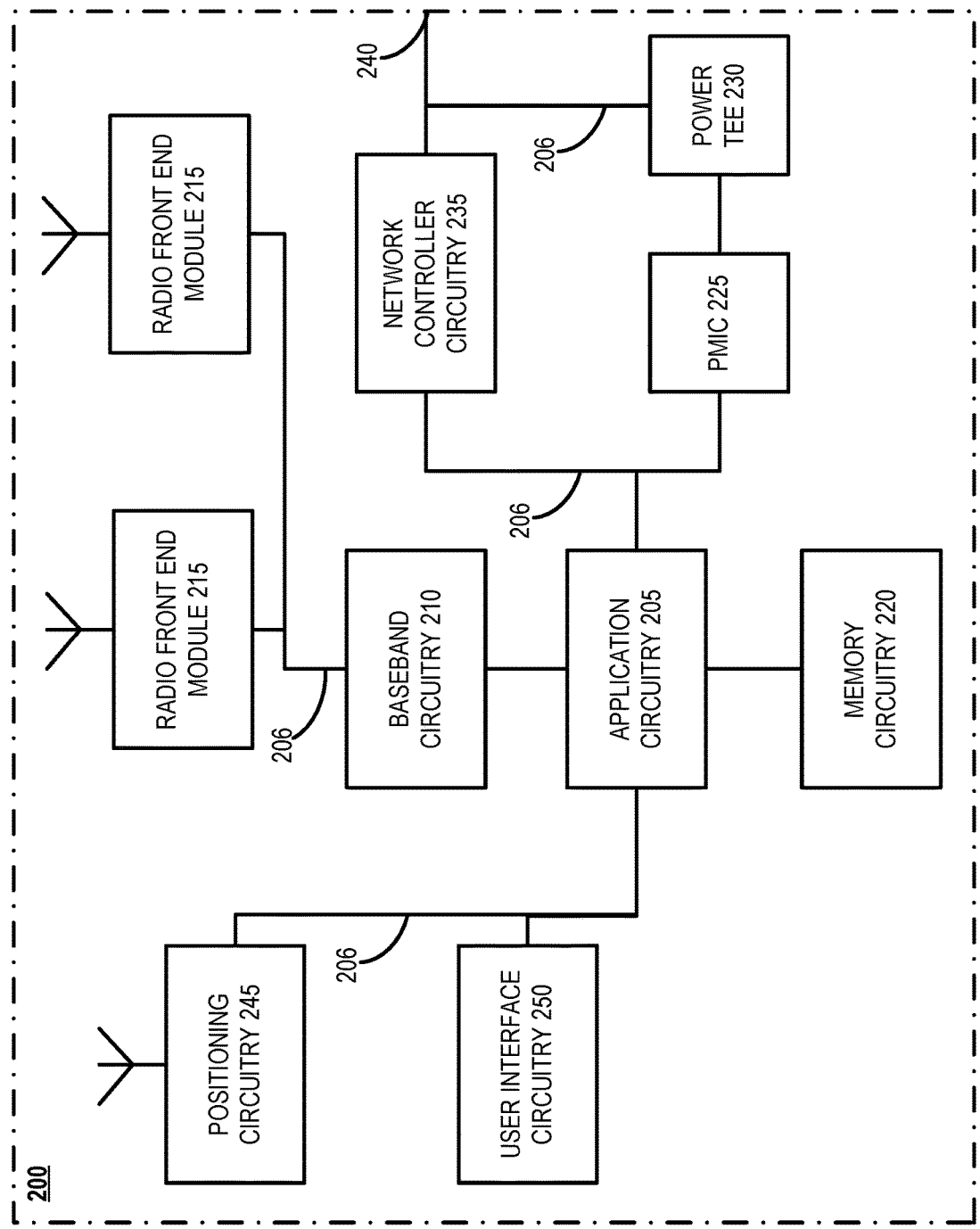
FIG. 2 illustrates an example infrastructure equipment in accordance with various embodiments.

FIG. 2 illustrates an example of infrastructure equipment 200 in accordance with various embodiments. The infrastructure equipment 200 (or "system 200") may be implemented as a base station, radio head, RAN node such as the RAN nodes 111 and/or AP 106 shown and described previously, application server(s) 130, and/or any other element/device discussed herein. In other examples, the system 200 could be implemented in or by a UE.

The system 200 includes application circuitry 205, baseband circuitry 210, one or more radio front end modules (RFEMs) 215, memory circuitry 220, power management integrated circuitry (PMIC) 225, power tee circuitry 230, network controller circuitry 235, network interface connector 240, satellite positioning circuitry 245, and user interface 250. In some embodiments, the device 200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. The term "circuitry" as used herein refers to a circuit or system of multiple circuits configured to perform a particular function in an electronic device. The circuit or system of circuits may be part of, or include one or more hardware components, such as logic circuits, processor(s) (shared, dedicated, or group) and/or memory (shared, dedicated, or group), Integrated Circuits (ICs), Application-specific ICs (ASICs), Field Programmable Gate Arrays (FPGAs), Digital Signal Processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" as used herein refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" refers to one or more independent electronic circuits packaged onto a circuit board, FPGA, ASIC, SoC, SiP, etc., configured to provide a basic function within a computer system. A "module" may include a processor circuitry (shared, dedicated, or group) and/or memory circuitry shared, dedicated, or group), etc., that execute one or more software or firmware programs, a combinational logic circuit, and/or other suitable components that provide the described functionality. As used herein, the term "interface circuitry" refers to, is part of, or includes circuitry providing for the exchange of information between two or more components or devices. The term "interface circuitry" refers to one or more hardware interfaces, for example, buses, input/output (I/O) interfaces, peripheral component interfaces, network interface cards, and/or the like.

Application circuitry 205 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 205 may be coupled with or may include memory/storage elements and may be configured to execute instructions stored in the memory/storage to enable various applications or operating systems to run on the system 200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 205 may comprise, or may be, a special-purpose processor/controller to operate according to the various embodiments herein. As examples, the processor(s) of application circuitry 205 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 200 may not utilize application circuitry 205, and instead may include a special-purpose processor/controller to process IP data received from an EPC or 5GC, for example.

In some implementations, the application circuitry 205 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs), programmable logic devices (PLDs), ASICs and/or structured ASICs, SoCs and/or programmable SoCs (PSoCs), and the like. In such implementations, the circuitry of application circuitry 205 may comprise logic blocks or logic fabric, and other interconnected resources that may be programmed to perform various functions, such as the procedures, methods, functions, etc. of the various embodiments discussed herein. In such embodiments, the circuitry of application circuitry 205 may include memory cells (e.g., erasable programmable read-only memory (EPROM), electrically erasable programmable read-only memory (EEPROM), flash memory, static memory (e.g., static random access memory (SRAM), anti-fuses, etc.))

used to store logic blocks, logic fabric, data, etc. in look-up-tables (LUTs) and the like.

The baseband circuitry 210 may be implemented, for example, as a solder-down substrate including one or more integrated circuits, a single packaged integrated circuit soldered to a main circuit board or a multi-chip module containing two or more integrated circuits. The baseband circuitry 210 includes one or more processing devices (e.g., baseband processors) to carry out various protocol and radio control functions. Baseband circuitry 210 may interface with application circuitry of system 200 for generation and processing of baseband signals and for controlling operations of the RFEMs 215. The baseband circuitry 210 may handle various radio control functions that enable communication with one or more radio networks via the RFEMs 215. The baseband circuitry 210 may include circuitry such as, but not limited to, one or more single-core or multi-core processors (e.g., one or more baseband processors) or control logic to process baseband signals received from a receive signal path of the RFEMs 215, and to generate baseband signals to be provided to the RFEMs 215 via a transmit signal path. In various embodiments, the baseband circuitry 210 may implement a RTOS to manage resources of the baseband circuitry 210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

User interface circuitry 250 may include one or more user interfaces designed to enable user interaction with the system 200 or peripheral component interfaces designed to enable peripheral component interaction with the system 200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 220 may be implemented as one or more of solder down packaged integrated circuits, socketed memory modules and plug-in memory cards.

The PMIC 225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 230 may provide for electrical power drawn from a network cable to provide both power supply and data connectivity to the infrastructure equipment 200 using a single cable.

The network controller circuitry 235 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 200 via network interface connector 240 using a physical connection, which may be electrical (commonly referred to as a "copper interconnect"), optical, or wireless. The network controller circuitry 235 may include one or more dedicated processors and/or FPGAs to communicate using one or more of the aforementioned protocols. In some implementations, the network controller circuitry 235 may include multiple controllers to provide connectivity to other networks using the same or different protocols.

The positioning circuitry 245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 245 may include a Micro-Technology for Positioning, Navigation, and Timing (Micro-PNT) IC that uses a master timing clock to perform position tracking/estimation without GNSS assistance. The positioning circuitry 245 may also be part of, or interact with, the baseband circuitry 210 and/or RFEMs 215 to communicate with the nodes and components of the positioning network. The positioning circuitry 245 may also provide position data and/or time data to the application circuitry 205, which may use the data to synchronize operations with various infrastructure (e.g., RAN nodes 111, etc.), or the like.

The components shown by FIG. 2 may communicate with one another using interface circuitry 206 or IX 206, which may include any number of bus and/or IX technologies such as Industry Standard Architecture (ISA), extended ISA, inter-integrated circuit (VC), Serial Peripheral Interface (SPI), point-to-point interfaces, power management bus (PMBus), Peripheral Component Interconnect (PCI), PCI express (PCIe), PCI extended (PCIx), Intel® Ultra Path Interconnect (UPI), Intel® Accelerator Link (IAL), Coherent Accelerator Processor Interface (CAPI), OpenCAPI™, Intel® QuickPath Interconnect (QPI), Intel® Omni-Path Architecture (OPA) IX, RapidIO™ system IXs, Cache Coherent Interconnect for Accelerators (CCIX), Gen-Z Consortium IXs, a HyperTransport IX, NVLink provided by NVIDIA®, and/or any number of other IX technologies. Additionally or alternatively, the IX technology may be a proprietary bus, for example, used in an SoC based system.

Figure 3:
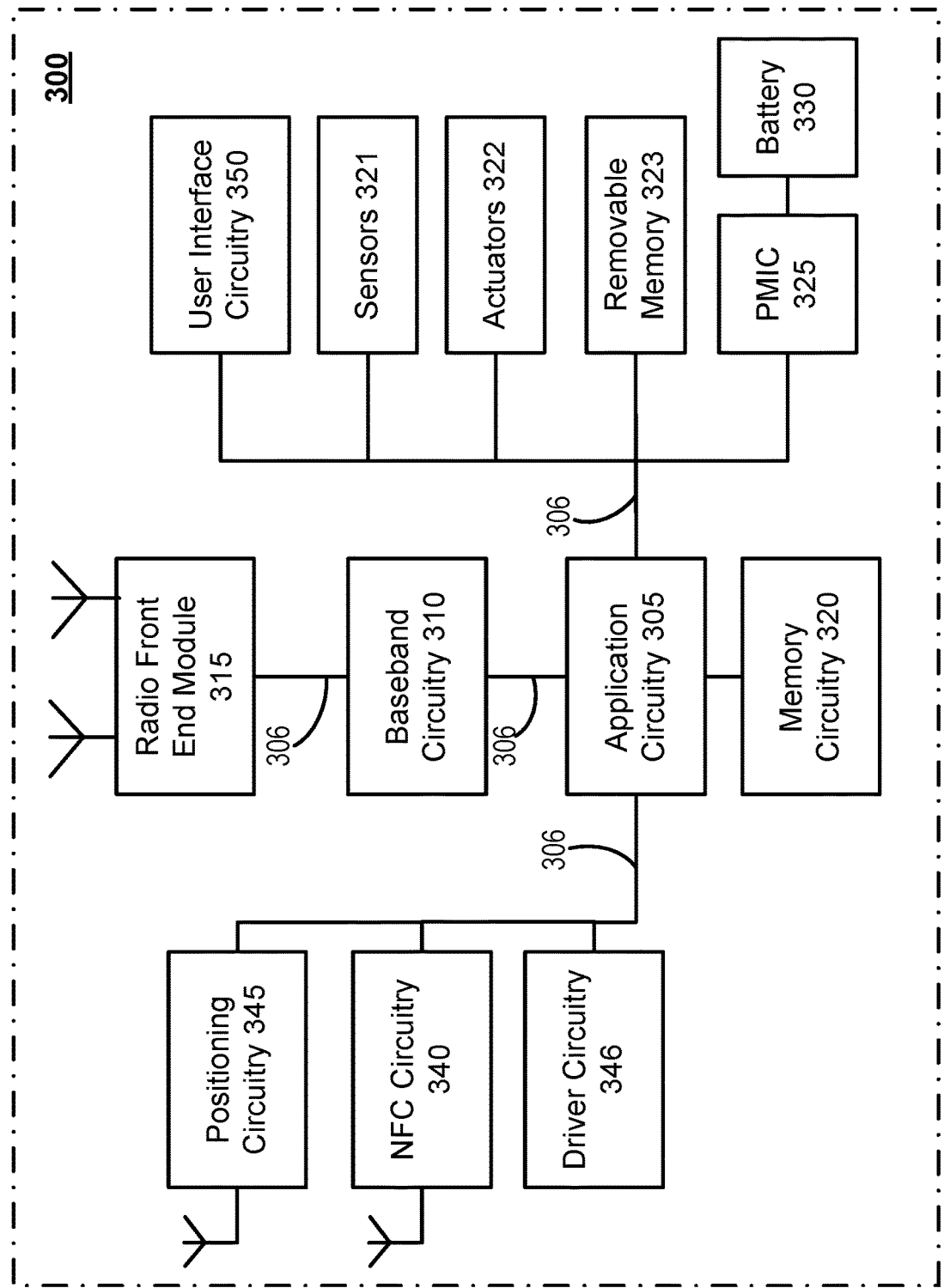
FIG. 3 illustrates an example of a platform in accordance with various embodiments.

FIG. 3 illustrates an example of a platform 300 (or "device 300") in accordance with various embodiments. In embodiments, the computer platform 300 may be suitable for use as UEs 101, application servers 130, and/or any other element/device discussed herein. The platform 300 may include any combinations of the components shown in the example. The components of platform 300 may be implemented as integrated circuits (ICs), portions thereof, discrete electronic devices, or other modules, logic, hardware, software, firmware, or a combination thereof adapted in the computer platform 300, or as components otherwise incorporated within a chassis of a larger system. Some of the components shown may be omitted, additional components may be present, and different arrangement of the components shown may occur in other implementations.

Application circuitry 305 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 may be coupled with or may include memory/storage elements and may be configured to execute instructions stored in the memory/storage to enable various applications or operating systems to run on the system 300. In some implementations, the memory/storage elements may be on-chip memory circuitry, which may include any suitable volatile and/or nonvolatile memory, such as DRAM, SRAM, EPROM, EEPROM, Flash memory, solid-state memory, and/or any other type of memory device technology, such as those discussed herein.

The processor(s) of application circuitry 205 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 205 may comprise, or may be, a special-purpose processor/controller to operate according to the various embodiments herein.

As examples, the processor(s) of application circuitry 305 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 305 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 305 may be a part of a system on a chip (SoC) in which the application circuitry 305 and other components are formed into a single integrated circuit, or a single package, such as the Edison™ or Galileo™ SoC boards from Intel® Corporation.

Additionally or alternatively, application circuitry 305 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may comprise logic blocks or logic fabric, and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 310 are discussed infra with regard to Figure XT.

The RFEMs 315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array XT111 of Figure XT infra), and the RFEM may be connected to multiple antennas. In alternative implementations, both mmWave and sub-mmWave radio functions may be implemented in the same physical RFEM 315, which incorporates both mmWave antennas and sub-mmWave.

The memory circuitry 320 may include any number and type of memory devices used to provide for a given amount of system memory. As examples, the memory circuitry 320 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 320 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 320 may be on-die memory or registers associated with the application circuitry

305. To provide for persistent storage of information such as data, applications, operating systems and so forth, memory circuitry 320 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 300 may incorporate the three-dimensional (3D) cross-point (XPOINT) memories from Intel® and Micron®.

Removable memory circuitry 323 may include devices, circuitry, enclosures/housings, ports or receptacles, etc. used to couple portable data storage devices with the platform 300. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 300 may also include interface circuitry (not shown) that is used to connect external devices with the platform 300. The external devices connected to the platform 300 via the interface circuitry include sensor circuitry 321 and electro-mechanical components (EMCs) 322, as well as removable memory devices coupled to removable memory circuitry 323.

The sensor circuitry 321 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

The actuators 322, allow platform 300 to change its state, position, and/or orientation, or move or control a mechanism or system. The actuators 322 comprise electrical and/or mechanical devices for moving or controlling a mechanism or system, and converts energy (e.g., electric current or moving air and/or liquid) into some kind of motion. The actuators 322 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 322 may include one or more electro-mechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 300 may be configured to operate one or more actuators 322 based on one or more captured events and/or instructions or control signals received from a service provider and/or various client systems.

In some implementations, the interface circuitry may connect the platform 300 with positioning circuitry 345. The positioning circuitry 345 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 345 may include a Micro-PNT IC that uses a master timing clock to perform position tracking/estimation without GNSS assistance. The positioning circuitry 345 may also be part of, or interact with, the baseband circuitry 210 and/or RFEMs 315 to communicate with the nodes and components of the positioning network. The positioning circuitry 345 may also provide position data and/or time data to the application circuitry 305, which may use the data to synchronize operations with various infrastructure (e.g., radio base stations), for turn-by-turn navigation applications, or the like In some implementations, the interface circuitry may connect the platform 300 with Near-Field Communication (NFC) circuitry 340. NFC circuitry 340 is configured to provide contactless, short-range communications based on radio frequency identification (RFID) standards, wherein magnetic field induction is used to enable communication between NFC circuitry 340 and NFC-enabled devices external to the platform 300 (e.g., an "NFC touchpoint"). NFC circuitry 340 comprises an NFC controller coupled with an antenna element and a processor coupled with the NFC controller. The NFC controller may be a chip/IC providing NFC functionalities to the NFC circuitry 340 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 340, or initiate data transfer between the NFC circuitry 340 and another active NFC device (e.g., a smartphone or an NFC-enabled POS terminal) that is proximate to the platform 300.

The driver circuitry 346 may include software and hardware elements that operate to control particular devices that are embedded in the platform 300, attached to the platform 300, or otherwise communicatively coupled with the platform 300. The driver circuitry 346 may include individual drivers allowing other components of the platform 300 to interact with or control various input/output (I/O) devices that may be present within, or connected to, the platform 300. For example, driver circuitry 346 may include a display driver to control and allow access to a display device, a touchscreen driver to control and allow access to a touchscreen interface of the platform 300, sensor drivers to obtain sensor readings of sensor circuitry 321 and control and allow access to sensor circuitry 321, EMC drivers to obtain actuator positions of the EMCs 322 and/or control and allow access to the EMCs 322, a camera driver to control and allow access to an embedded image capture device, audio drivers to control and allow access to one or more audio devices.

The power management integrated circuitry (PMIC) 325 (also referred to as "power management circuitry 325") may manage power provided to various components of the platform 300. In particular, with respect to the baseband circuitry 310, the PMIC 325 may control power-source selection, voltage scaling, battery charging, or DC-to-DC conversion. The PMIC 325 may often be included when the platform 300 is capable of being powered by a battery 330, for example, when the device is included in a UE 101.

In some embodiments, the PMIC 325 may control, or otherwise be part of, various power saving mechanisms of the platform 300. For example, if the platform 300 is in an RRC_Connected state, where it is still connected to the RAN node as it expects to receive traffic shortly, then it may enter a state known as Discontinuous Reception Mode (DRX) after a period of inactivity. During this state, the platform 300 may power down for brief intervals of time and thus save power. If there is no data traffic activity for an extended period of time, then the platform 300 may transition off to an RRC_Idle state, where it disconnects from the network and does not perform operations such as channel quality feedback, handover, etc. The platform 300 goes into a very low power state and it performs paging where again it periodically wakes up to listen to the network and then powers down again. The platform 300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 330 may power the platform 300, although in some examples the platform 300 may be mounted deployed in a fixed location, and may have a power supply coupled to an electrical grid. The battery 330 may be a lithium ion battery, a metal-air battery, such as a zinc-air battery, an aluminum-air battery, a lithium-air battery, and the like. In some implementations, such as in V2X applications, the battery 330 may be a typical lead-acid automotive battery.

In some implementations, the battery 330 may be a "smart battery," which includes or is coupled with a Battery Management System (BMS) or battery monitoring integrated circuitry. The BMS may be included in the platform 300 to track the state of charge (SoCh) of the battery 330. The BMS may be used to monitor other parameters of the battery 330 to provide failure predictions, such as the state of health (SoH) and the state of function (SoF) of the battery 330. The BMS may communicate the information of the battery 330 to the application circuitry 305 or other components of the platform 300. The BMS may also include an analog-to-digital (ADC) convertor that allows the application circuitry 305 to directly monitor the voltage of the battery 330 or the current flow from the battery 330. The battery parameters may be used to determine actions that the platform 300 may perform, such as transmission frequency, network operation, sensing frequency, and the like.

A power block, or other power supply coupled to an electrical grid may be coupled with the BMS to charge the battery 330. In some examples, the power block 40 may be replaced with a wireless power receiver to obtain the power wirelessly, for example, through a loop antenna in the computer platform 300. In these examples, a wireless battery charging circuit may be included in the BMS. The specific charging circuits chosen may depend on the size of the battery 330, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 350 includes various input/output (I/O) devices present within, or connected to, the platform 300, and includes one or more user interfaces designed to enable user interaction with the platform 300 and/or peripheral component interfaces designed to enable peripheral component interaction with the platform 300. The user interface circuitry 350 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 300. The output device circuitry may also include speakers or other audio emitting devices, printer(s), and/or the like. In some embodiments, the sensor circuitry 321 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

The components shown by FIG. 3 may communicate with one another using interface circuitry 306 or IX 306, which may include any number of bus and/or IX technologies such as ISA, extended ISA, I²C, SPI, point-to-point interfaces, PMBus, PCI, PCIe, PCIx, Intel® UPI, Intel® IAL, Intel® CXL, CAPI, OpenCAPI, Intel® QPI, Intel® UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. Additionally or alternatively, the IX technology may be a proprietary bus, for example, used in an SoC based system.

Figure 4:
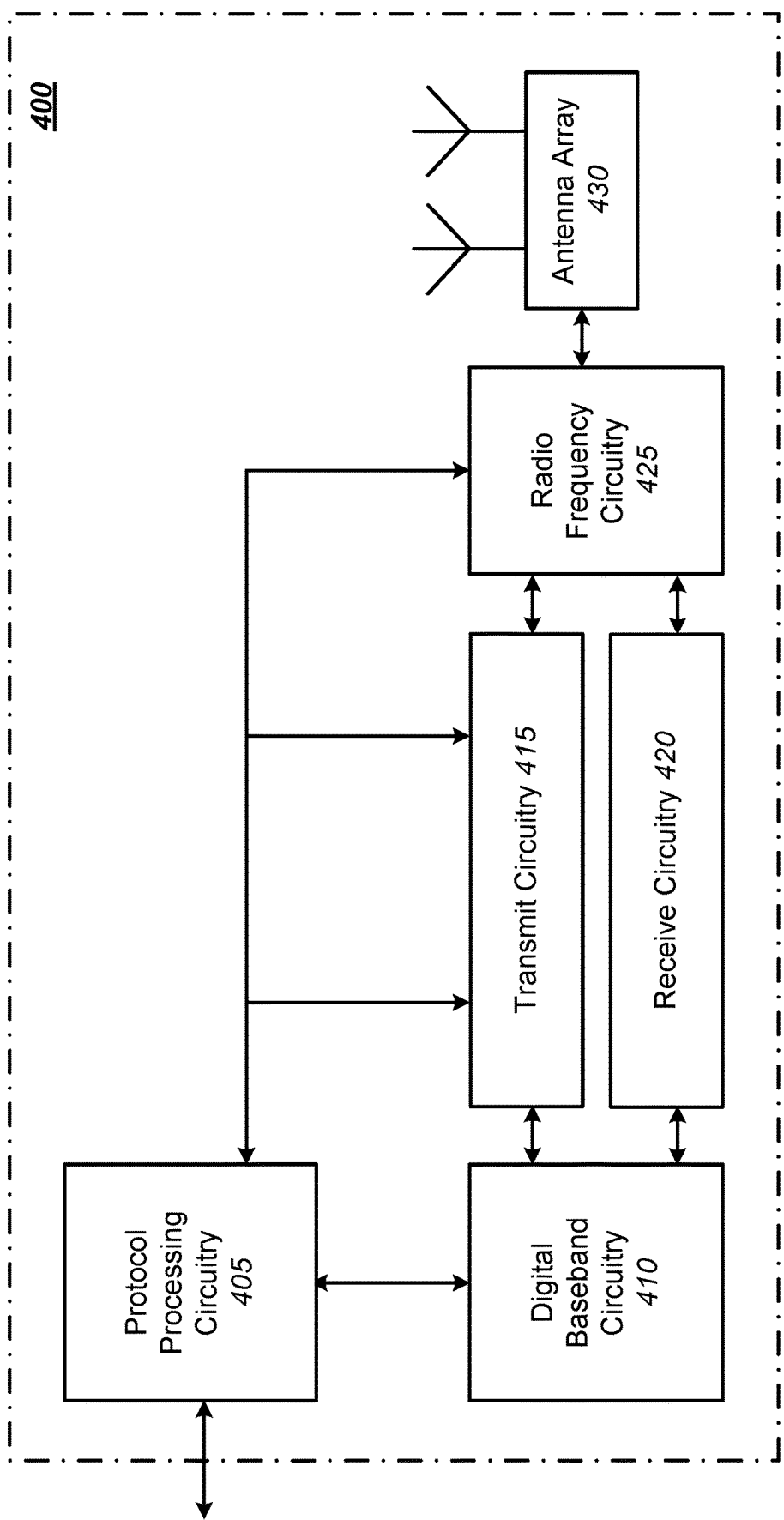
FIG. 4 illustrates an example of communication circuitry that may be used to practice the embodiments discussed herein.

FIG. 4 illustrates an example of communication circuitry 400 that may be used to practice the embodiments discussed herein. Components as shown by FIG. 4 are shown for illustrative purposes and may include other components not shown by FIG. 4, or the elements shown by FIG. 4 may by alternatively be grouped according to functions.

The communication circuitry 400 includes protocol processing circuitry 405, which operates or implements various protocol layers/entities of one or more wireless communication protocols. In one example, the protocol processing circuitry 405 may operate Long Term Evolution (LTE) protocol entities and/or Fifth Generation (5G)/New Radio (NR) protocol entities when the communication circuitry 400 is a cellular radiofrequency communication system, such as millimeter wave (mmWave) communication circuitry or some other suitable cellular communication circuitry. In this example, the protocol processing circuitry 405 would operate medium access control (MAC), radio link control (RLC), packet data convergence protocol (PDCP), service data adaptation protocol (SDAP), radio resource control (RRC), and non-access stratum (NAS) functions. In another example, the protocol processing circuitry 405 may operate one or more IEEE-based protocols when the communication circuitry 400 is WiFi communication system. In this example, the protocol processing circuitry 405 would operate MAC and logical link control (LLC) functions.

The protocol processing circuitry 405 may include one or more memory structures (not shown) to store program code and data information for operating the protocol functions, as well as one or more processing cores (not shown) to execute the program code and perform various operations using the data information. The protocol processing circuitry 405 may include one or more instances of control circuitry (not shown) to provide control functions for the digital baseband circuitry 410, transmit circuitry 415, receive circuitry 420, and/or radiofrequency (RF) circuitry 425. In some embodiments, the protocol processing circuitry 405 and/or the baseband circuitry 410 correspond to the baseband circuitry 210 and 310 of FIGS. 2 and 3, respectively.

The communication circuitry 400 also includes digital baseband circuitry 410, which implements physical layer (PHY) functions including hybrid automatic repeat request (HARQ) functions, scrambling and/or descrambling, (en) coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. The modulation/demodulation functionality may include Fast-Fourier Transform (FFT), precoding, or constellation mapping/demapping functionality. The encoding/decoding functionality may include convolution, tail-biting convolution, turbo, Viterbi, Low Density Parity Check (LDPC) coding, polar coding, etc. Embodiments of modulation/demodulation and encoder/decoder functionality are not limited to these examples and may include other suitable functionality in other embodiments.

Baseband processing circuitry 410 and/or protocol processing circuitry 405 may interface with an application platform (e.g., application circuitry 205 or application circuitry 305 of FIGS. 2 and 3, respectively) for generation and processing of baseband signals and for controlling operations of the RF circuitry 425. The digital baseband circuitry 410 may handle various radio control functions that enable communication with one or more radio networks via the RF circuitry 425. The digital baseband circuitry 410 may include circuitry such as, but not limited to, one or more single-core or multi-core processors (e.g., one or more baseband processors) or control logic to process baseband signals received from a receive signal path of the RF circuitry 425 (e.g., via Rx circuitry 420) and to generate baseband signals for a transmit signal path of the RF circuitry 425 (e.g., via Tx circuitry 415). The digital baseband circuitry 410 may comprise a multi-protocol baseband processor or the like.

As mentioned previously, the digital baseband circuitry 410 may include or implement encoder circuitry, which accepts input data, generates encoded data based on the input data, and outputs the encoded data to a modulation mapper. The encoder may also perform one or more of error detecting, error correcting, rate matching, and interleaving. The encoder may further include scrambling based on a scrambling sequence such as those discussed herein. The digital baseband circuitry 410 may include or implement a sequence generator to generate, for example, low Peak to Average Power Ratio (low-PAPR) sequences (see e.g., section 5.2.2 of TS 38.211), pseudo-random noise (PN) sequences (see e.g., section 5.2.1 of TS 38.211), and/or reference signal sequences. In some embodiments, the sequence generator may be a part of the encoder circuitry.

The digital baseband circuitry 410 may include or implement a modulation mapper that takes binary digits as input (e.g., the encoded data from the encoder) and produces complex-valued modulation symbols as an output. The modulation mapper may operate one or more suitable modulation schemes, such as those discussed by, for example, section 5.1 of TS 38.211. The modulation mapper may map groups containing one or more binary digits, selected from the encoded data, to complex valued modulation symbols according to one or more mapping tables. The complex-valued modulation symbols may be input to a layer mapper to be mapped to one or more layer mapped modulation symbol streams (see e.g., sections 6.3.1.3 and 7.3.1.3 of TS 38.211). The one or more streams of layer mapped symbols may be input to precoder that generates one or more streams of precoded symbols, which may be represented as a block of vectors. The precoder may be configured to perform a direct mapping using a single antenna port, transmit diversity using space-time block coding, or spatial multiplexing. Each stream of precoded symbols may be input to a resource mapper that generates a stream of resource mapped symbols (e.g., REs). The resource mapper may map precoded symbols to frequency domain subcarriers and time domain symbols according to a mapping, which may include contiguous block mapping, randomized mapping, and/or sparse mapping according to a mapping code.

The digital baseband circuitry 410 may also include or implement a baseband signal generator (also referred to as a "multicarrier generator") to generate OFDM baseband signals and/or other baseband signals. In these embodiments, the resource mapped symbols from the resource mapper are input to the baseband signal generator which generates time domain baseband symbol(s). The baseband signal generator may generate a time domain signal (e.g., a set of time domain symbols) using, for example, an inverse discrete Fourier transform, commonly implemented as an inverse fast Fourier transform (IFFT) or a filter bank comprising one or more filters. The time-domain signal that results from the IFFT is transmitted across the radio channel. At the receiver, an FFT block is used to process the received signal and bring it into the frequency domain which is used to recover the original data bits. Other/additional aspects of the operation of the digital baseband circuitry 410 are discussed by TS 38.211.

The communication circuitry 400 also includes transmit (Tx) circuitry 415 and receive (Rx) circuitry 420. The Tx circuitry 415 is configured to convert digital baseband signals into analog signals for transmission by the RF circuitry 425. To do so, in one embodiment, the Tx circuitry 415 includes various components, such as digital to analog converters (DACs), analog baseband circuitry, up-conversion circuitry, and filtering and amplification circuitry. Additionally or alternatively, the Tx circuitry 415 may include digital transmit circuitry and output circuitry.

The Rx circuitry 420 is configured to convert analog signals received by the RF circuitry 425 into digital baseband signals to be provided to the digital baseband circuitry 410. To do so, in one embodiment, the Rx circuitry 420 includes parallel receive circuitry and/or one or more instances of combined receive circuitry. The parallel receive circuitry and instances of the combined receive circuitry may include Intermediate Frequency (IF) down-conversion circuitry, IF processing circuitry, baseband down-conversion circuitry, baseband processing circuitry, and analog-to-digital converter (ADC) circuitry.

The communication circuitry 400 also includes radiofrequency (RF) circuitry 425 to enable communication with wireless networks using modulated electromagnetic radiation through a non-solid medium. The RF circuitry 425 includes a receive signal path, which may include circuitry to convert analog RF signals (e.g., an existing or received modulated waveform) into digital baseband signals to be provided to the digital baseband circuitry 410 via the Rx circuitry 420. The RF circuitry 425 also includes a transmit signal path, which may include circuitry configured to convert digital baseband signals provided by the digital baseband circuitry 410 via the Tx circuitry 415 to be converted into analog RF signals (e.g., modulated waveform) that will be amplified and transmitted via the antenna array 430.

RF circuitry 425 may include one or more instances of radio chain circuitry, which may include one or more filters, power amplifiers, low noise amplifiers, programmable phase shifters, and power supplies (not shown). RF circuitry 425 may also include power combining and dividing circuitry. The power combining and dividing circuitry may operate bidirectionally, such that the same physical circuitry may be configured to operate as a power divider when the device is transmitting, and as a power combiner when the device is receiving. In some embodiments, the power combining and dividing circuitry may include wholly or partially separate circuitries to perform power dividing when the device is transmitting and power combining when the device is receiving. The power combining and dividing circuitry may include passive circuitry comprising one or more two-way power divider/combiners arranged in a tree. In some embodiments, the power combining and dividing circuitry may include active circuitry comprising amplifier circuits.

The communication circuitry 400 also includes antenna array 430. The antenna array 430 include one or more antenna elements. The antenna array 430 may be a plurality of microstrip antennas or printed antennas that are fabricated on the surface of one or more printed circuit boards. The antenna array 430 may be formed in as a patch of metal foil (e.g., a patch antenna) in a variety of shapes, and may be coupled with the RF circuitry 425 using metal transmission lines or the like.

Figure 5B:
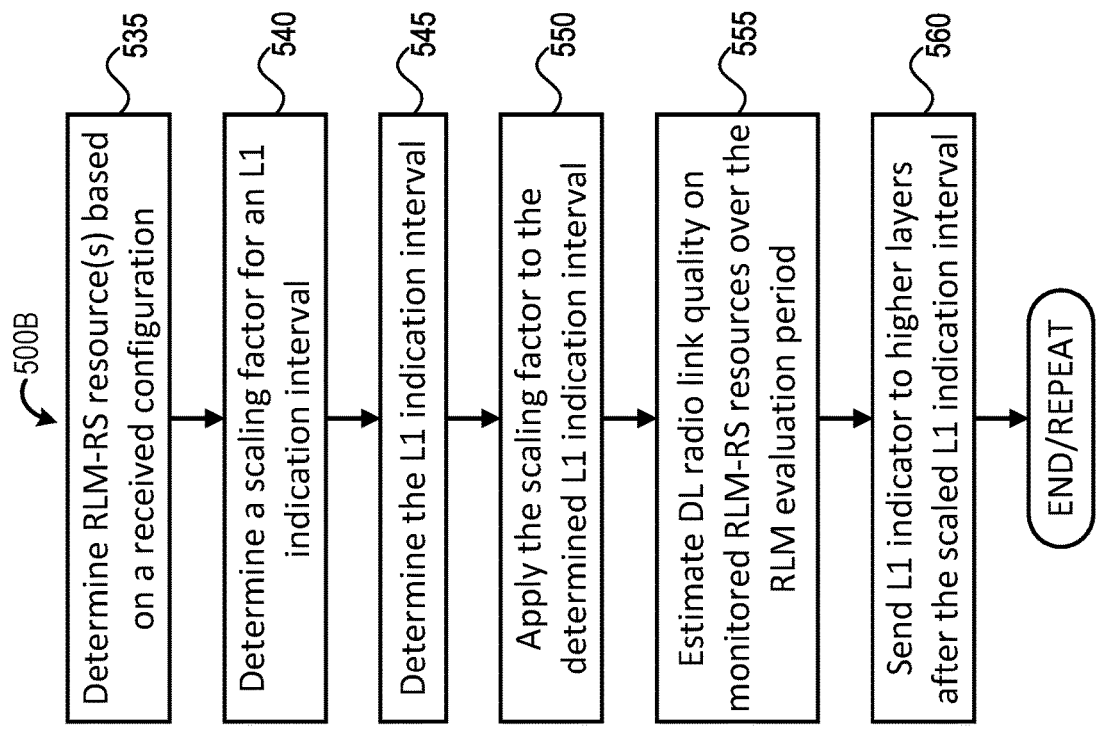
FIGS. 5A, 5B, and 6 depict example processes for practicing the various embodiments discussed herein.
Figure 5A:
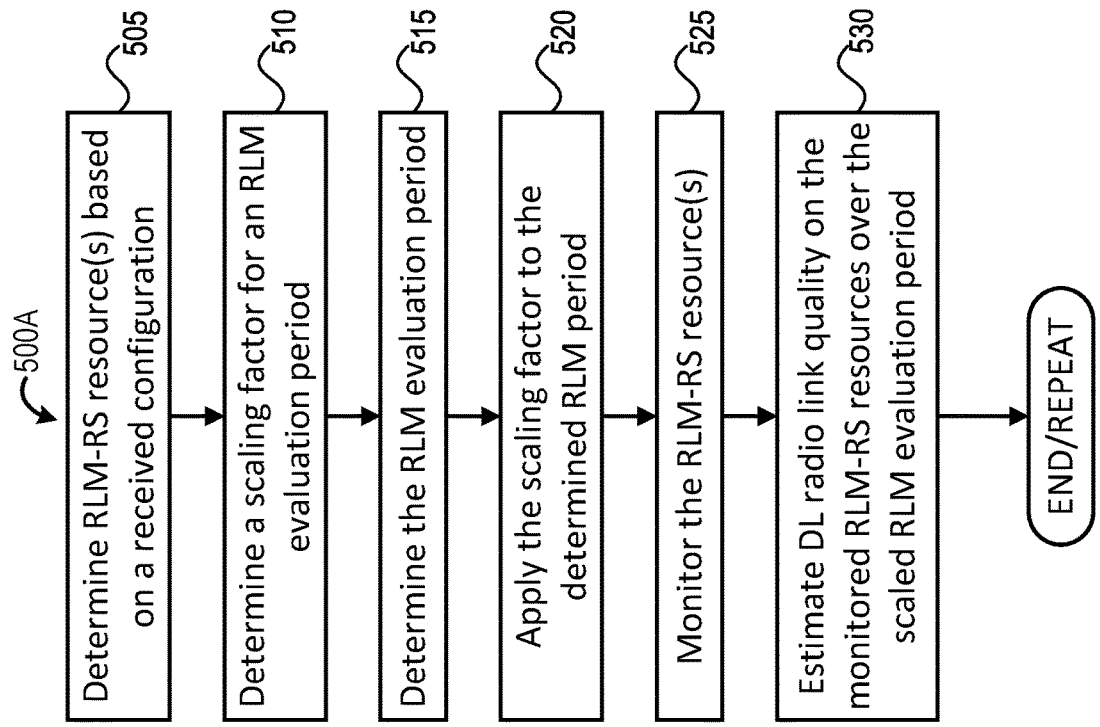
Figure 6A:
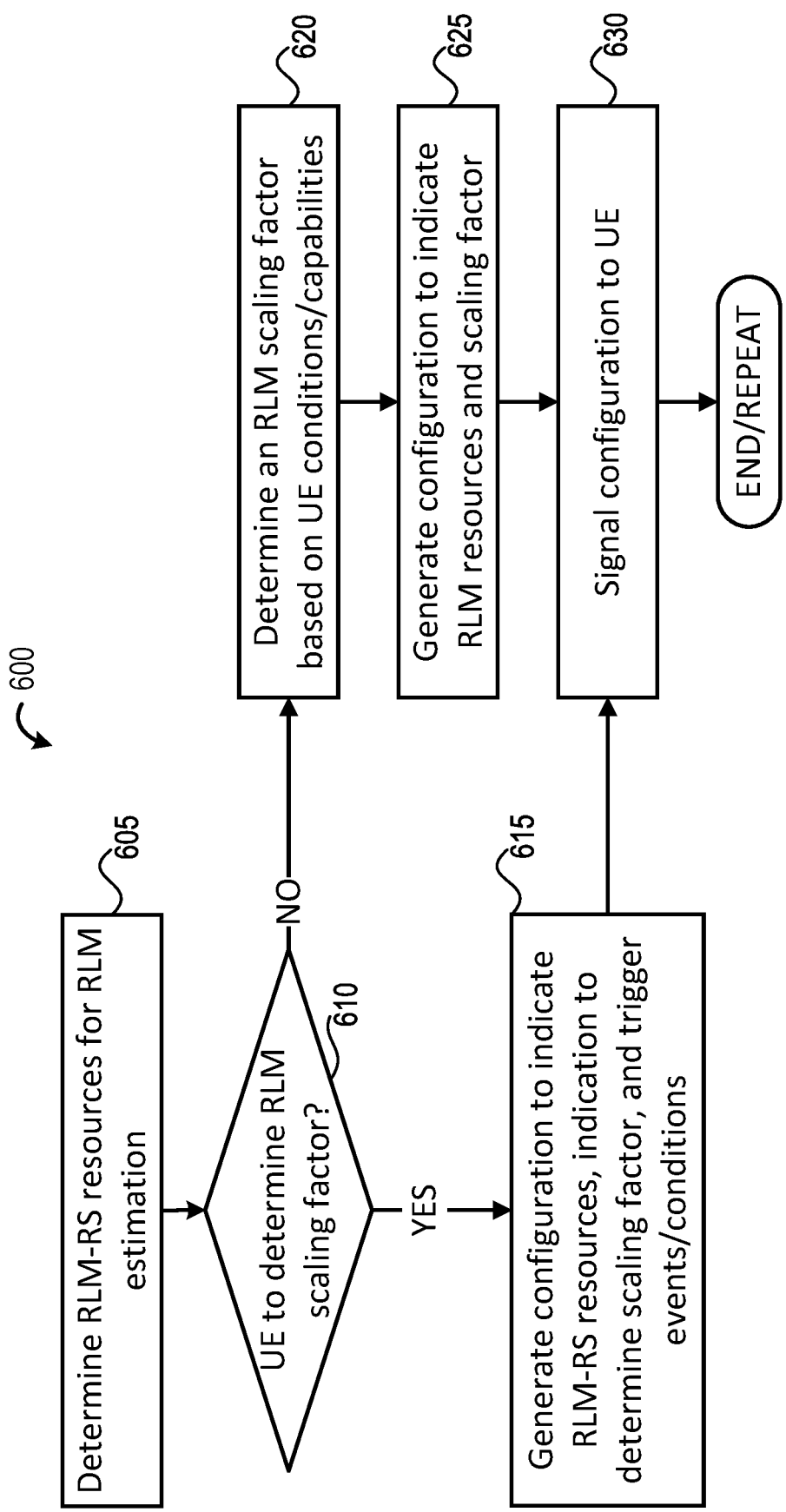

FIGS. 5A, 5B, and 6 example procedures 500A, 500B, and 600, respectively, in accordance with various embodiments. The processes 500A, 500B, and 600 may be embodied as one or more computer readable storage media comprising program code, instructions, or other like a computer program product (or data to create the computer program product), which is to cause a computing device (e.g., UE 101 or RAN node 111) to perform electronic operations and/or to perform the specific sequence or flow of actions described with respect to FIGS. 5A, 5B, and 6. While particular examples and orders of operations are illustrated FIGS. 5A, 5B, and 6, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 5A depicts an example process 500A according to various embodiments. Process 500A begins at operation 505 where the UE 101 (or baseband circuitry of the UE 101) determines, based on a received configuration, one or more RLM-RS resources. At operation 510, the UE 101 (or baseband circuitry of the UE 101) determines a scaling factor to be used to scale an RLM evaluation period. At operation 515, the UE 101 (or RF circuitry of the UE 101) determines the RLM evaluation period, and at operation 520, the UE 101 (or RF circuitry of the UE 101) applies the scaling factor to the determined RLM evaluation period. At operation 525, the UE 101 (or RF circuitry of the UE 101) monitors the RLM resources, and at operation 530, the UE 101 (or RF circuitry of the UE 101) estimates the DL RLQ on the monitored RLM-RS resources over the scaled RLM evaluation period. After operation 530, process 500A ends or repeats as necessary.

FIG. 5B depicts an example process 500B according to various embodiments. Process 500B begins at operation 535 where a UE 101 (or RF circuitry of the UE 101) determines, based on a received configuration, one or more RLM-RS resources.

At operation 540, the UE 101 (or RF circuitry of the UE 101) determines a scaling factor to be used to scale an RLM L1 indication interval, and at operation 545, the UE 101 (or RF circuitry of the UE 101) determines the L1 indication interval. At operation 550, the UE 101 (or RF circuitry of the UE 101) applies the scaling factor to the determined L1 indication interval. At operation 555, the UE 101 (or RF circuitry of the UE 101) monitors the one or more RLM-RS resources and estimates the DL RLQ on the monitored RLS-RS resources over an RLM evaluation period. At operation 560, the UE 101 (or RF circuitry of the UE 101) sends, from an L1 entity (e.g., PHY) to a higher layer entity (e.g., an RLC entity), an L1 indication based on the estimated DL radio link quality after the scaled L1 indication interval. After operation 560, process 500B ends or repeats as necessary.

FIG. 6 depicts an example process 600 according to various embodiments. Process 600 begins at operation 605 where a RAN node 111 (or application circuitry and/or baseband circuitry of the RAN node 111) determines RLM-RS resource(s) to be used for RLM estimation purposes. At operation 610, the RAN node 111 (or RFEM(s) of the RAN node 111) determines whether a UE 101 is to determine a scaling factor (or scaling factor index) for itself. The scaling factor (or scaling factor index) may be an RLM evaluation period scaling factor and/or an L1 indication interval scaling factor. In some embodiments, this determination may be based on various UE conditions, capabilities, and/or the like, such as those discussed previously. If at operation 610 the RAN node 111 determines that the UE 101 is to determine the scaling factor for itself, the RAN node 111 (or RFEM(s) of the RAN node 111) proceeds to operation 615 to generate a configuration to indicate the RLM-RS resource(s), an indication to indicate that the UE 101 should determine the scaling factor (or scaling factor index) for itself, and one or more trigger events or other like conditions/criteria for determining the scaling factor (or scaling factor index), including when to determine the scaling factor (or scaling factor index). Then at operation 630, the RAN node 111 (or RFEM(s) of the RAN node 111) signals the configuration to the UE 101.

If at operation 610 the RAN node 111 determines that the UE 101 is not to determine the scaling factor for itself, the RAN node 111 (or RFEM(s) of the RAN node 111) proceeds to operation 620 to determine the RLM scaling factor (or scaling factor index) based on the various UE conditions, criteria, etc. At operation 625, the RAN node 111 (or RFEM(s) of the RAN node 111) generates a configuration to indicate the RLM-RS resource(s), and the determined RLM scaling factor (or scaling factor index). At operation 630, the RAN node 111 (or RFEM(s) of the RAN node 111) signals the configuration to the UE 101. After operation 630, process 600 ends or repeats as necessary.

Some non-limiting examples are as follows. The following examples pertain to further embodiments, and specifics in the examples may be used anywhere in one or more embodiments discussed previously. Any of the following examples may be combined with any other example or any embodiment discussed herein.

Example A01 includes a method of operating a user equipment (UE), the method comprising: determining, by baseband circuitry of a System-on-Chip (SoC) implemented in the UE based on a received configuration, one or more Radio Link Monitoring Reference Signal (RLM-RS) resources; determining, by the baseband circuitry, a scaling factor to be used to scale a Radio Link Monitoring (RLM) evaluation period; monitoring, by the baseband circuitry, the one or more RLM-RS resources; and estimating, by the baseband circuitry, a downlink (DL) radio link quality on the monitored RLS-RS resources over the scaled RLM evaluation period.

Example A02 includes the method of example A01 and/or some other example(s) herein, further comprising: determining, by the baseband circuitry, the RLM evaluation period; and applying, by the baseband circuitry, the scaling factor to the determined RLM evaluation period.

Example A03 includes the method of examples A01-A02 and/or some other example(s) herein, wherein the configuration is to indicate the scaling factor, and the method further comprises: identifying, by the baseband circuitry, the scaling factor in an information element (IE) in the configuration.

Example A04 includes the method of examples A01-A02 and/or some other example(s) herein, wherein the configuration is to indicate the scaling factor, and the method further comprises: identifying, by the baseband circuitry, a scaling factor index in an IE in the configuration; and determining, by the baseband circuitry, the scaling factor using the identified scaling factor index.

Example A05 includes the method of examples A01-A02 and/or some other example(s) herein, wherein the configuration is to indicate that the UE is to determine the scaling factor for the RLM evaluation period, and the method further comprises: determining, by the baseband circuitry, the scaling factor in response to detection of a triggering event.

Example A06 includes the method of example A05 and/or some other example(s) herein, wherein the configuration is to indicate the triggering event.

Example A07 includes the method of examples A01-A06 and/or some other example(s) herein, further comprising: generating, by the baseband circuitry, a report to indicate the scaled RLM evaluation period; and providing, by the baseband circuitry, the generated report to radiofrequency (RF) circuitry via interface circuitry of the SoC for transmission to a Radio Access Network (RAN) node.

Example A08 includes the method of example A07 and/or some other example(s) herein, further comprising: determining, by the baseband circuitry, another scaling factor to be used to scale an RLM layer 1 (L1) indication interval; and operating, by the baseband circuitry, a physical layer entity to send an L1 indicator to a higher layer entity based on the estimated DL radio link quality after the scaled L1 indication interval.

Example A09 includes the method of example A08 and/or some other example(s) herein, further comprising: determining, by the baseband circuitry, the L1 indication interval; and applying, by the baseband circuitry, the other scaling factor to the determined L1 indication interval.

Example A10 includes the method of example A09 and/or some other example(s) herein, further comprising: generating, by the baseband circuitry, a report to indicate the scaled L1 indication interval; and providing, by the baseband circuitry, the generated report to RF circuitry via the interface circuitry for transmission to a RAN node.

Example B01 includes a method to be performed by a user equipment (UE), the method comprising: determining, based on a received configuration, one or more Radio Link Monitoring Reference Signal (RLM-RS) resources; determining a scaling factor to be used to scale an RLM layer 1 (L1) indication interval; monitoring the one or more RLM-RS resources; and estimating a downlink (DL) radio link quality on the monitored RLS-RS resources over an RLM evaluation period; and sending, from a L1 entity to a higher layer entity, an L1 indication based on the estimated DL radio link quality after the scaled L1 indication interval.

Example B02 includes the method of example B01 and/or some other example(s) herein, further comprising: determining the L1 indication interval; and applying the scaling factor to the determined L1 indication interval.

Example B03 includes the method of example B01 and/or some other example(s) herein, wherein the configuration is to indicate the scaling factor, and the method comprises: identifying the scaling factor in an information element (IE) in the configuration.

Example B04 includes the method of example B01 and/or some other example(s) herein, wherein the configuration is to indicate the scaling factor, and the method comprises: identifying a scaling factor index in an IE in the configuration; and determining the scaling factor using the identified scaling factor index.

Example B05 includes the method of example B01 and/or some other example(s) herein, wherein the configuration is to indicate that the UE is to determine the scaling factor for the RLM evaluation period, and the method comprises: determining the scaling factor in response to detection of a triggering event.

Example B06 includes the method of example B05 and/or some other example(s) herein, wherein the configuration is to indicate the triggering event.

Example B07 includes the method of examples B01-B06 and/or some other example(s) herein, further comprising: generating a report to indicate the scaled L1 indication interval; and providing the generated report to radiofrequency (RF) circuitry via interface circuitry for transmission to a Radio Access Network (RAN) node.

Example B08 includes the method of example B07 and/or some other example(s) herein, further comprising: determining another scaling factor to be used to scale an RLM evaluation period; and estimating the DL radio link quality on the monitored RLS-RS resources over the scaled RLM evaluation period.

Example B09 includes the method of example B08 and/or some other example(s) herein, further comprising: determining the RLM evaluation period; and apply the other scaling factor to the determined RLM evaluation period.

Example B10 includes the method of example B09 and/or some other example(s) herein, further comprising: generating a report to indicate the scaled RLM evaluation period; and providing the generated report to RF circuitry via interface circuitry for transmission to a RAN node.

Example C01 includes a method to be performed by a Radio Access Network (RAN) node, the method comprising: generating a configuration to indicate one or more Radio Link Monitoring Reference Signal (RLM-RS) resources on which downlink (DL) radio link quality is to be estimated, and an indication of a scaling factor to be used for the DL radio link quality estimation; and signaling the configuration to a user equipment (UE).

Example C2 includes the method of example C01 and/or some other example(s) herein, wherein the scaling factor is a scaling factor to scale an RLM evaluation period, or the scaling factor is a scaling factor to scale a layer 1 (L1) indication interval.

Example C03 includes the method of examples C01-C02 and/or some other example(s) herein, wherein the indication of the scaling factor is a scaling factor value, or the indication of the scaling factor is a scaling factor index to be used by the UE to determine the scaling factor value.

Example C04 includes the method of example C03 and/or some other example(s) herein, further comprising: determining the scaling factor based on one or more of a status of the UE, a UE mobility state, a Radio Resource Control (RRC) state of the UE, a registration management state of the UE, a connection management state of the UE, a session management state of the UE, or one or more UE capabilities.

Example C05 includes the method of example C03, wherein the generating further comprises: generating the configuration to further include an indicator to indicate that the UE is to determine the scaling factor or the scaling factor index based on one or more of a status of the UE, a UE mobility state, a Radio Resource Control (RRC) state of the UE, a registration management state of the UE, a connection management state of the UE, a session management state of the UE, or one or more UE capabilities.

Example Z01 may include an apparatus comprising means to perform one or more elements of a method described in or related to any of examples A01-A10, B01-B10, C01-C05, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A01-A10, B01-B10, C01-C05, or any other method or process described herein.

Example Z03 may include an apparatus comprising logic, modules, or circuitry to perform one or more elements of a method described in or related to any of examples A01-A10, B01-B10, C01-C05, or any other method or process described herein.

Example Z04 may include a method, technique, or process as described in or related to any of examples A01-A10, B01-B10, C01-C05, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A01-A10, B01-B10, C01-C05, or portions thereof.

Example Z06 may include a signal as described in or related to any of examples A01-A10, B01-B10, C01-C05, or portions or parts thereof. Example Z07 may include a datagram, packet, frame, segment, protocol data unit (PDU), or message as described in or related to any of examples A01-A10, B01-B10, C01-C05, or portions or parts thereof, or otherwise described in the present disclosure.

Example Z08 may include a signal encoded with data as described in or related to any of examples A01-A10, B01-B10, C01-C05, or portions or parts thereof, or otherwise described in the present disclosure.

Example Z09 may include a signal encoded with a datagram, packet, frame, segment, protocol data unit (PDU), or message as described in or related to any of examples A01-A10, B01-B10, C01-C05, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A01-A10, B01-B10, C01-C05, or portions thereof.

Example Z11 may include a computer program comprising instructions, wherein execution of the program by a processing element is to cause the processing element to carry out the method, techniques, or process as described in or related to any of examples A01-A10, B01-B10, C01-C05, or portions thereof.

Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein.

Any of the above-described examples may be combined with any other example (or combination of examples), unless explicitly stated otherwise. The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous. The term "coupled" (or variants thereof) may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "communicatively coupled" may mean that two or more elements may be in contact with one another by a means of communication including through a wire or other interconnect connection, through a wireless communication channel or ink, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A user equipment (UE) comprising:
a radio front end circuitry; and
a baseband circuitry coupled to the radio front end circuitry, the baseband circuitry configured to:
determine, based on a received configuration, one or more Radio Link Monitoring Reference Signal (RLM-RS) resources;
determine, for frequency range 1 (FR1), a first scaling factor to be used to scale a first Radio Link Monitoring (RLM) evaluation period corresponding to a first type of RLM-RS resource of the one or more RLM-RS resources based on a mobility or a coverage of the UE;
multiplying the first scaling factor and the first RLM evaluation period to provide a scaled first RLM evaluation period;
determine, for frequency range 1 (FR1), a second scaling factor to be used to scale a second RLM evaluation period corresponding to a second type of RLM-RS resource of the one or more RLM-RS resources based on the mobility or the coverage of the UE, wherein the second scaling factor is different from the first scaling factor;
multiplying the second scaling factor and the second RLM evaluation period to provide a scaled second RLM evaluation period;
monitor the one or more RLM-RS resources;
estimate a first downlink (DL) radio link quality on the first type of RLM-RS resources over the scaled first RLM evaluation period; and
estimate a second DL radio link quality on the second type of RLM-RS resources over the scaled second RLM evaluation period.

2. The UE of claim 1, wherein the configuration is to indicate the first scaling factor and the second scaling factor, and the baseband circuitry is further to:
identify the first scaling factor and the second scaling factor in an information element (IE) in the configuration.

3. The UE of claim 1, wherein the configuration is to indicate the first scaling factor and the second scaling factor, and the baseband circuitry is further to:
identify scaling factor indices in an IE in the configuration; and
determine the first scaling factor and the second scaling factor using the identified scaling factor indices.

4. The UE of claim 1, wherein the configuration is to indicate that the UE is to determine the respective first scaling factor and the second scaling factor for the first RLM evaluation period and the scaled second RLM evaluation period, and the baseband circuitry is further configured to:
determine the first scaling factor and the second scaling factor in response to detection of a triggering event.

5. The UE of claim 4, wherein the configuration is to indicate the triggering event.

6. The UE of claim 1, wherein the baseband circuitry is further configured to:
generate a report to indicate the scaled first RLM evaluation period and the scaled second RLM evaluation period; and
provide the generated report to the radio front end circuitry for transmission to a base station (BS).

7. The UE of claim 6, wherein the baseband circuitry is further configured to:
determine another scaling factor to be used to scale an RLM layer 1 (L1) indication interval;
operate a physical layer entity to send an L1 indicator to a higher layer entity based on the estimated DL radio link quality after the scaled L1 indication interval.

8. The UE of claim 1, wherein the baseband circuitry is further configured to:
determine the first scaling factor based on the mobility and the coverage of the UE; and
determine the second scaling factor based on the mobility and the coverage of the UE.

9. The UE of claim 1, wherein the baseband circuitry is further configured to:
scale an RLM layer 1 (L1) indication interval using the first scaling factor; and
operate a physical layer entity to send an L1 indicator to a higher layer entity based on the estimated DL radio link quality after the scaled L1 indication interval.

10. A non-transitory computer-readable storage media (CRSM) having instructions stored thereon that, when executed by one or more processors of a user equipment (UE), causes the UE to perform operations, the operations comprising:
determining, based on a received configuration, one or more Radio Link Monitoring Reference Signal (RLM-RS) resources;
determining, for frequency range 1 (FR1), a first scaling factor to be used to scale a first Radio Link Monitoring (RLM) evaluation period corresponding to a first type of RLM-RS resource of the one or more RLM-RS resources based on a mobility or a coverage of the UE;
multiplying the first scaling factor and the first RLM evaluation period to provide a scaled first RLM evaluation period;
determining, for frequency range 1 (FR1), a second scaling factor to be used to scale a second RLM evaluation period corresponding to a second type of RLM-RS resource of the one or more RLM-RS resources based on the mobility or the coverage of the UE, wherein the second scaling factor is different from the first scaling factor;
multiplying the second scaling factor and the second RLM evaluation period to provide a scaled second RLM evaluation period;
monitoring the one or more RLM-RS resources;

estimating a first downlink (DL) radio link quality on the first type of RLM-RS resources over the scaled first RLM evaluation period; and estimating a second DL radio link quality on the second type of RLM-RS resources over the scaled second RLM evaluation period.

11. The non-transitory CRSM of claim 10, wherein the configuration is to indicate the scaling factor, and the operations further comprise:

identifying the first scaling factor and the second scaling factor in an information element (IE) in the configuration.

12. The non-transitory CRSM of claim 10, wherein the configuration is to indicate the first scaling factor and the second scaling factor, and the operations further comprise:

identifying one or more scaling factor indices in an IE in the configuration; and determining the first scaling factor and the second scaling factor using the identified scaling factor indices.

13. The non-transitory CRSM of claim 10, wherein the configuration is to indicate that the UE is to determine the first scaling factor and the second scaling factor for the first RLM evaluation period and the scaled second RLM evaluation period, and the operations further comprise:

determining the first scaling factor and the second scaling factor in response to detection of a triggering event.

14. The non-transitory CRSM of claim 13, wherein the configuration is to indicate the triggering event.

15. The non-transitory CRSM of claim 10, wherein the operations further comprise:

generating a report to indicate the scaled first RLM evaluation period and the scaled second RLM evaluation period; and providing the generated report to a radio front end circuitry for transmission to a base station (BS).

16. The non-transitory CRSM of claim 10, wherein the operations further comprise:

determine the first scaling factor based on the mobility and the coverage of the UE; and determine the second scaling factor based on the mobility and the coverage of the UE.

17. The non-transitory CRSM of claim 10, wherein the operations further comprise:

scale an RLM layer 1 (L1) indication interval using the first scaling factor; and operate a physical layer entity to send an L1 indicator to a higher layer entity based on the estimated DL radio link quality after the scaled L1 indication interval.

* * * * *